(12) United States Patent
Gladnick

(10) Patent No.: US 12,242,047 B2
(45) Date of Patent: Mar. 4, 2025

(54) METROLOGY SYSTEM UTILIZING ANNULAR OPTICAL CONFIGURATION

(71) Applicant: Mitutoyo Corporation, Kanagawa-ken (JP)

(72) Inventor: Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 84 days.

(21) Appl. No.: 18/344,705

(22) Filed: Jun. 29, 2023

(65) Prior Publication Data

US 2025/0004263 A1 Jan. 2, 2025

(51) Int. Cl.
*G02B 21/24* (2006.01)
*G01N 21/88* (2006.01)
(Continued)

(52) U.S. Cl.
CPC ....... *G02B 21/248* (2013.01); *G01N 21/8806* (2013.01); *G02B 21/06* (2013.01);
(Continued)

(58) Field of Classification Search
CPC .... G02B 21/248; G02B 21/06; G02B 21/365; H04N 23/67; H04N 23/74; H04N 23/56; H04N 23/55; G01N 21/8806
See application file for complete search history.

(56) References Cited

U.S. PATENT DOCUMENTS

| 1,840,448 A | 1/1932 | Heine |
| 4,567,551 A | 1/1986 | Choate |

(Continued)

FOREIGN PATENT DOCUMENTS

| EP | 2602649 A1 | 6/2013 |
| JP | 2003315678 A | 11/2003 |

(Continued)

OTHER PUBLICATIONS

Horowitz, "Recognition of health hazards in the workplace" (Year: 2019).*

(Continued)

*Primary Examiner* — Eileen M Adams
(74) *Attorney, Agent, or Firm* — Seed IP Law Group LLP

(57) ABSTRACT

An annular optical configuration is provided for utilization in a metrology system to redirect source light. The metrology system includes a camera that provides images of a workpiece at different focus positions through operation of a variable focal length lens and an objective lens configuration (OLC). The OLC includes one of a plurality of objective lenses having respective working distances and working distance focus positions. An annular lighting configuration directs source light toward a first central volume which includes a first working distance focus position of a first objective lens when the first objective lens is included in the OLC. When a second objective lens with a second working distance focus position is included in the OLC, the annular optical configuration is configured to be located in front of the lighting configuration to redirect the source light toward a second central volume which includes the second working distance focus position.

25 Claims, 14 Drawing Sheets

(51) Int. Cl.
  *G02B 21/06* (2006.01)
  *G02B 21/36* (2006.01)
  *H04N 23/55* (2023.01)
  *H04N 23/56* (2023.01)
  *H04N 23/67* (2023.01)
  *H04N 23/74* (2023.01)
(52) U.S. Cl.
  CPC .......... *G02B 21/365* (2013.01); *H04N 23/55* (2023.01); *H04N 23/56* (2023.01); *H04N 23/67* (2023.01); *H04N 23/74* (2023.01)

(56) References Cited

U.S. PATENT DOCUMENTS

| | | | |
|---|---|---|---|
| 5,038,258 A | 8/1991 | Koch et al. | |
| 5,461,417 A | 10/1995 | White et al. | |
| 5,684,530 A | 11/1997 | White | |
| 5,690,417 A | 11/1997 | Polidor et al. | |
| 6,179,439 B1 | 1/2001 | Choate | |
| 6,273,338 B1 | 8/2001 | White | |
| 6,454,437 B1 | 9/2002 | Kelly | |
| 6,542,180 B1 | 4/2003 | Wasserman et al. | |
| 6,857,762 B2 | 2/2005 | Shimokawa et al. | |
| 7,030,351 B2 | 4/2006 | Wasserman et al. | |
| 7,113,684 B1 | 9/2006 | Cianciotto et al. | |
| 7,127,159 B2 | 10/2006 | Gladnick et al. | |
| 7,171,097 B2 | 1/2007 | Cianciotto et al. | |
| 7,173,775 B2 | 2/2007 | Cianciotto et al. | |
| 7,324,682 B2 | 1/2008 | Wasserman | |
| 7,454,053 B2 | 11/2008 | Bryll et al. | |
| 7,564,623 B2 | 7/2009 | Vodyanoy et al. | |
| 7,570,795 B2 | 8/2009 | Yu et al. | |
| 7,627,162 B2 | 12/2009 | Blanford et al. | |
| 7,782,513 B1 | 8/2010 | Gladnick | |
| 8,085,295 B2 | 12/2011 | Tobiason et al. | |
| 8,111,905 B2 | 2/2012 | Campbell | |
| 8,111,938 B2 | 2/2012 | Bryll et al. | |
| 8,194,307 B2 | 6/2012 | Arnold et al. | |
| 8,581,162 B2 | 11/2013 | Campbell | |
| 8,926,152 B2 | 1/2015 | Burges | |
| 9,060,117 B2 | 6/2015 | Bryll et al. | |
| 9,143,674 B2 | 9/2015 | Gladnick | |
| 9,213,175 B2 | 12/2015 | Arnold | |
| 9,256,009 B2 | 2/2016 | Theriault et al. | |
| 9,726,876 B2 | 8/2017 | Bryll | |
| 9,736,355 B1 | 8/2017 | Bryll | |
| 9,774,765 B2 | 9/2017 | Bryll et al. | |
| 9,830,694 B2 | 11/2017 | Bryll | |
| 9,930,243 B2 | 3/2018 | Gladnick et al. | |
| 9,983,459 B2 | 5/2018 | Arnold | |
| 10,007,101 B2 | 6/2018 | Prantl et al. | |
| 10,101,572 B2 | 10/2018 | Bryll et al. | |
| 10,151,962 B2 | 12/2018 | Gladnick et al. | |
| 10,178,321 B2 | 1/2019 | Emtman et al. | |
| 10,520,650 B2 | 12/2019 | Freerksen et al. | |
| 10,578,827 B2 | 3/2020 | Cook | |
| 10,809,378 B1 | 10/2020 | Gladnick et al. | |
| 10,880,468 B1 | 12/2020 | Bryll | |
| 11,119,214 B2 | 9/2021 | Tobiason et al. | |
| 11,125,967 B2 | 9/2021 | Gladnick | |
| 2003/0156409 A1 | 8/2003 | Choate et al. | |
| 2003/0169431 A1 | 9/2003 | Moriuchi et al. | |
| 2005/0135766 A1 | 6/2005 | Cianciotto et al. | |
| 2006/0211802 A1 | 9/2006 | Asgari | |
| 2007/0242924 A1 | 10/2007 | Cianciotto et al. | |
| 2007/0263298 A1 | 11/2007 | El-Ghoroury et al. | |
| 2008/0123196 A1 | 5/2008 | Cianciotto | |
| 2008/0285254 A1 | 11/2008 | Shimokawa et al. | |
| 2010/0137990 A1 | 6/2010 | Apatsidis et al. | |
| 2011/0317396 A1* | 12/2011 | Emtman | F21V 9/20 264/21 |
| 2012/0026386 A1 | 2/2012 | Tomita | |
| 2016/0025903 A1 | 1/2016 | Arnold | |
| 2017/0052425 A1 | 2/2017 | Arnold | |
| 2017/0078549 A1 | 3/2017 | Emtman et al. | |
| 2018/0143419 A1 | 5/2018 | Bryll et al. | |
| 2018/0180773 A1 | 6/2018 | Usami et al. | |
| 2019/0369300 A1 | 12/2019 | Freerksen et al. | |
| 2021/0191228 A1* | 6/2021 | Gladnick | G02B 21/367 |

FOREIGN PATENT DOCUMENTS

| | | |
|---|---|---|
| JP | 2005158490 A | 6/2005 |
| JP | 5906849 B2 | 4/2016 |
| WO | WO 9922224 A1 | 5/1999 |

OTHER PUBLICATIONS

Dross et al., "Illumination Optics: Köhler integration optics improve illumination homogeneity," URL: https://www.laserfocusworld.com/optics/article/16551351/illumination-optics-khler-integration-optics-improve-illumination-homogeneity. (8 pages).

Edmund Optics Worldwide, "Imaging Resource Guide, Section 11.4, Telecentric Illumination." (7 pages).

Mermillod-Blondin et al., "High speed varifocal imaging with a tunable acoustic gradient index of refraction lens," *Optics Letters* 33(18):2146-2148, Sep. 15, 2008, (3 pages).

Mitutoyo Corporation & Micro Encoder Inc., "QVPAK—3D CNC Vision Measuring Machine—User's Guide," Manual No. 99MCB225A, Version 7, Series No. 359, Jan. 2003. (326 pages).

Wikipedia, "Telecentric lens," URL: https://en.wikipedia.org/w/index.php?title=Telecentric_lens&oldid=1063609064. (4 pages).

* cited by examiner

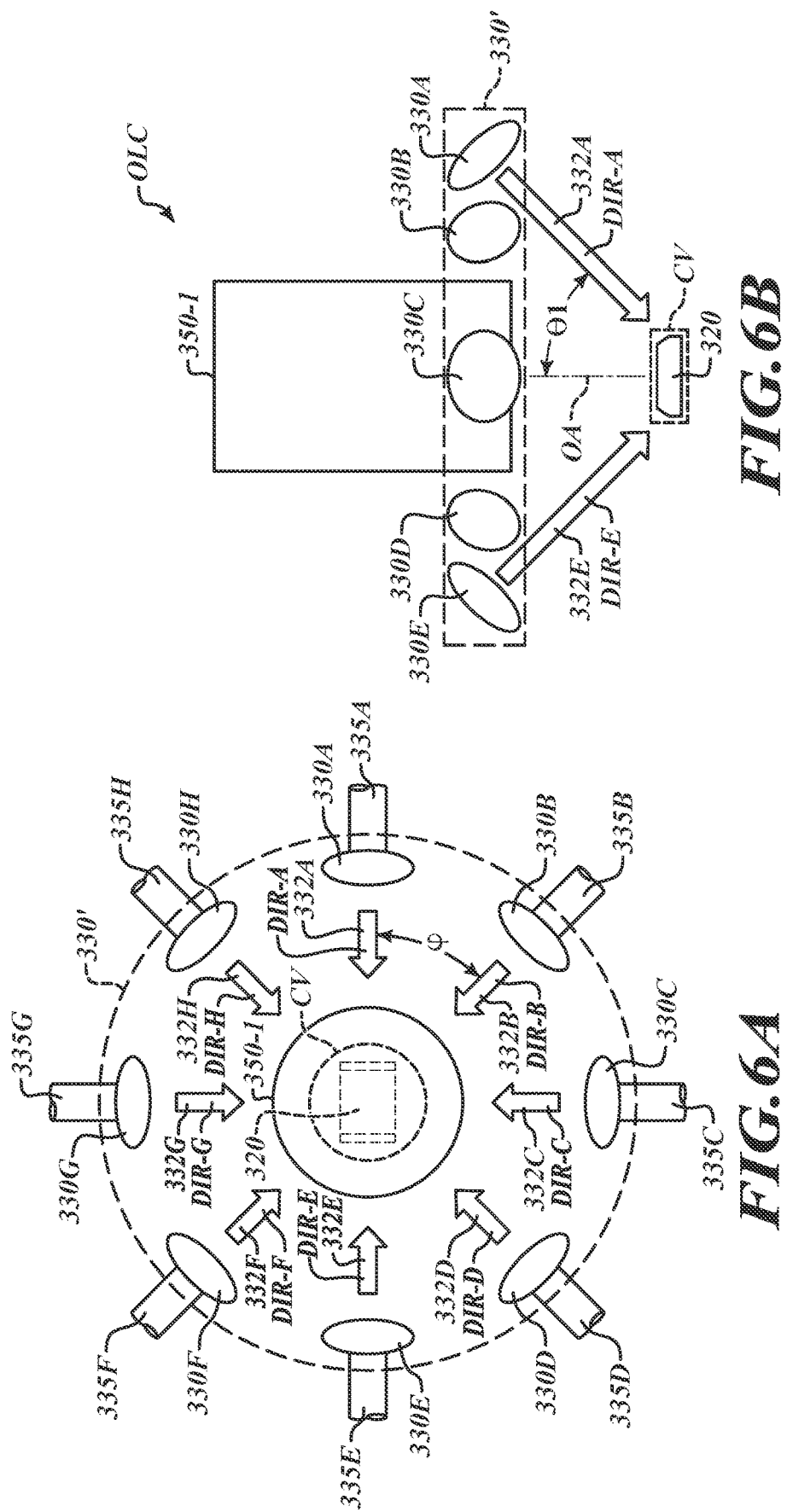

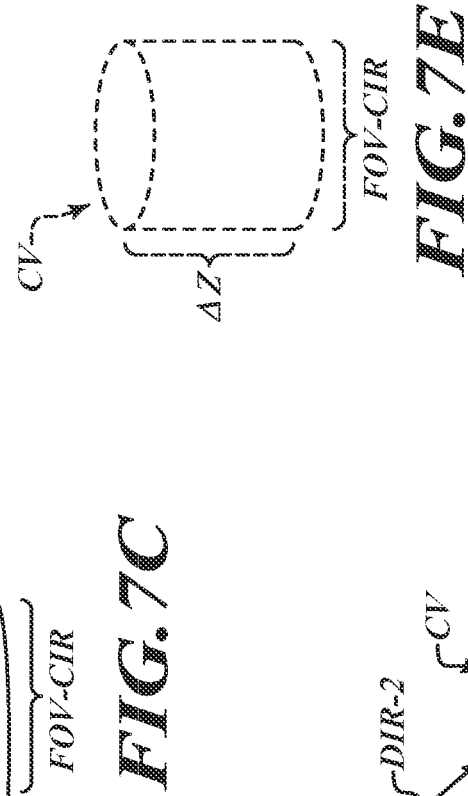
FIG. 7C
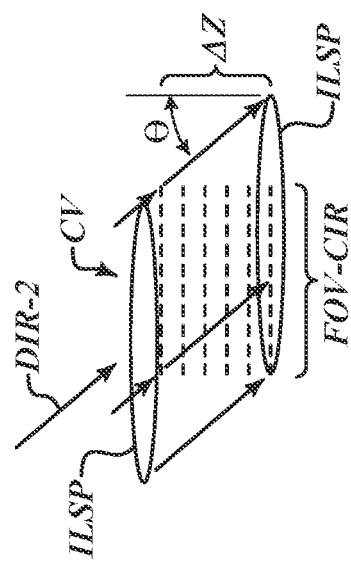
FIG. 7D
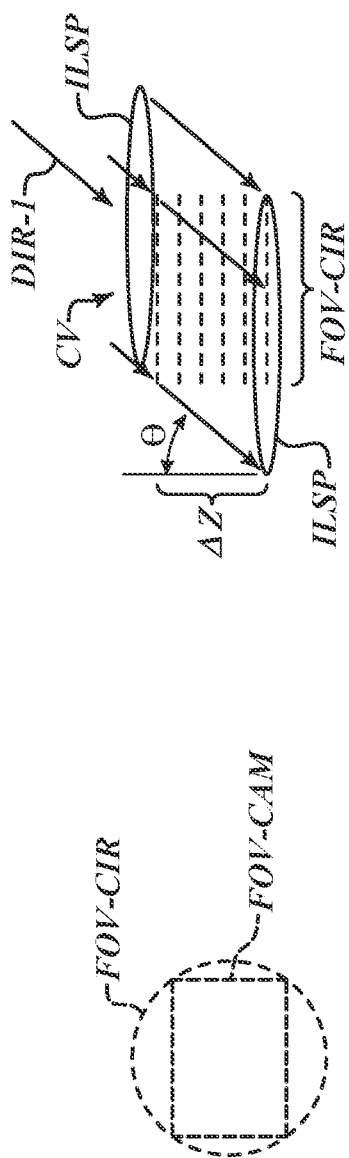
FIG. 7E
FIG. 7A
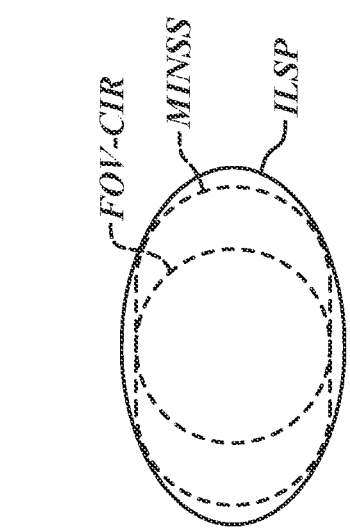
FIG. 7B

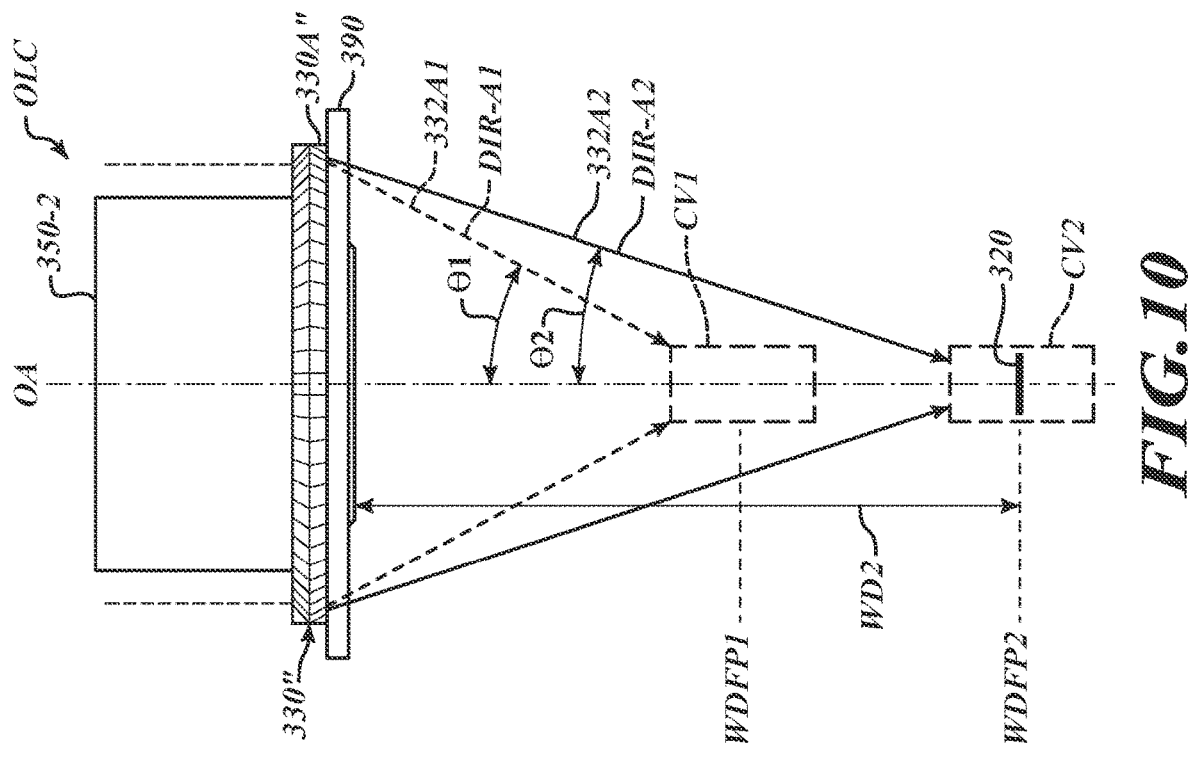
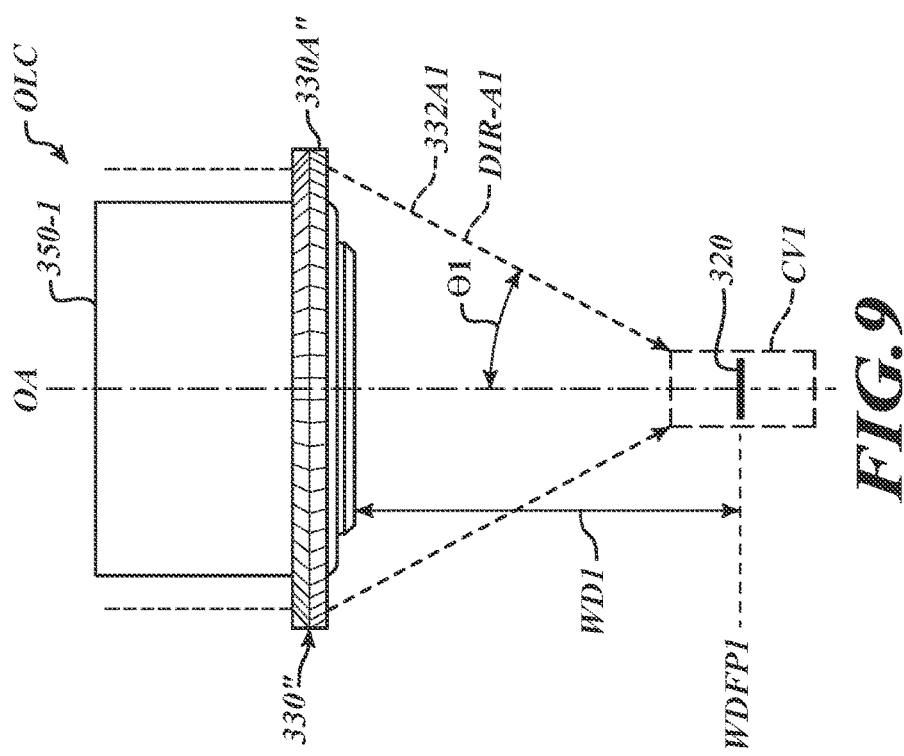

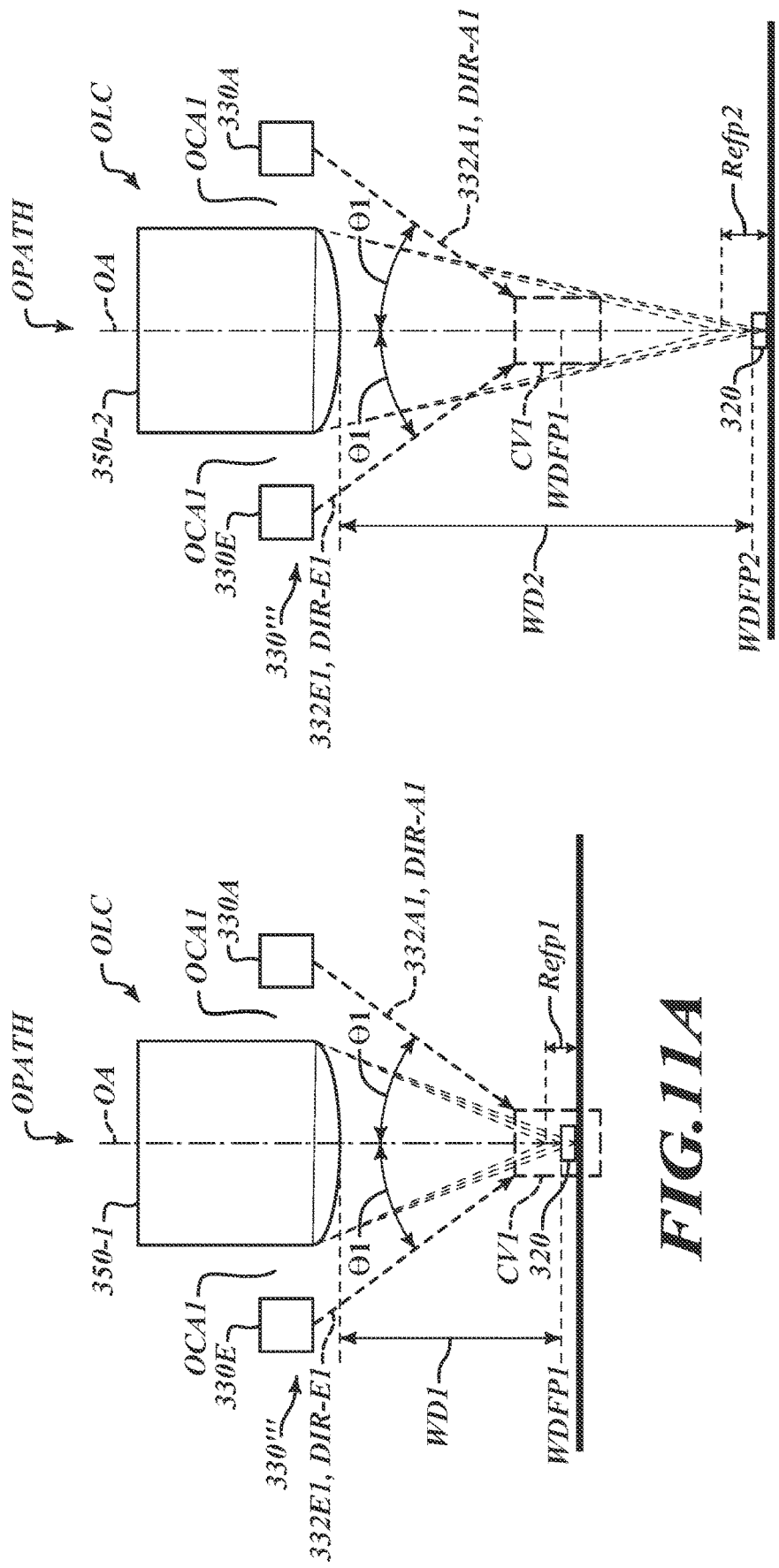

METROLOGY SYSTEM UTILIZING ANNULAR OPTICAL CONFIGURATION

BACKGROUND

Technical Field

This disclosure relates to precision metrology, and more particularly to metrology systems with annular lighting configurations for illuminating workpieces for which images may be acquired at different focus positions.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope type optical system and moves the stage to provide inspection images of workpieces.

Various types of lighting configurations may be utilized for illuminating a workpiece for imaging. For example, certain systems may utilize a coaxial light source, a stage light source or an annular light source (e.g., a ring light source) for illuminating certain types of workpieces. For some types of applications (e.g., utilizing different objective lenses in combination with a variable focal length lens for acquiring images of workpiece surfaces at different focus positions), such lighting configurations may have certain limitations (e.g., as limited in the intensity, uniformity, position and/or range over which the illumination may be provided, etc.) A system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided that includes a variable focal length (VFL) lens, a VFL lens controller, a camera, an objective lens configuration, an annular lighting configuration, and an annular optical configuration. The VFL lens controller is configured to control the VFL lens to periodically modulate the optical power of the VFL lens over a range of optical powers at an operating frequency, so as to vary a system focus position over a plurality of positions within a focus range. The objective lens configuration is configured to input image light arising from a workpiece and to transmit the image light along an imaging optical path that passes through the VFL lens. The camera is configured to receive image light transmitted along the imaging optical path that passes through the VFL lens and to provide images of the workpiece. The objective lens configuration is configured to include one of a plurality of interchangeable objective lenses at a time. The plurality of interchangeable objective lenses includes at least a first objective lens with a first working distance and a corresponding first working distance focus position, and a second objective lens with a second working distance and a corresponding second working distance focus position. The annular lighting configuration is configured to provide source light for illuminating the workpiece for producing the image light. While the first objective lens is included in the objective lens configuration, the annular lighting configuration is configured to direct source light toward a first central volume which includes the first working distance focus position. The annular optical configuration is configured to be utilized in combination with the second objective lens while the second objective lens is included in the objective lens configuration and to be located in front of the annular lighting configuration to redirect the source light toward a second central volume which includes the second working distance focus position.

In accordance with another aspect, a method for operating the metrology system is provided. The method includes controlling the VFL lens to periodically modulate the optical power of the VFL lens over a range of optical powers at an operating frequency so as to vary a system focus position of the system over a plurality of positions within a focus range, controlling the annular lighting configuration to direct source light toward the annular optical configuration which redirects the source light toward a second central volume for illuminating the workpiece to produce image light while the second objective lens is included in the objective lens configuration, and utilizing the camera to acquire a first image of the workpiece. The first image corresponds to a first system focus position along an optical axis of the objective lens configuration. The annular optical configuration is utilized in combination with the second objective lens and is located in front of the annular lighting configuration to redirect the source light toward the second central volume which includes the second working distance focus position.

In accordance with another aspect, an annular optical configuration for utilization in the metrology system is provided. The annular optical configuration is configured to be utilized in combination with the second objective lens while the second objective lens is included in the objective lens configuration and to be located in front of the annular lighting configuration to redirect the source light toward a second central volume which includes the second working distance focus position. The annular lighting configuration is configured to direct source light toward the annular optical configuration which redirects the source light toward the second central volume for illuminating the workpiece to produce the image light while the second objective lens is included in the objective lens configuration. An open central area of the annular optical configuration does not include any material in the imaging optical path.

BRIEF DESCRIPTION OF THE SEVERAL VIEWS OF THE DRAWINGS

FIGS. 6A and 6B are diagrams of an exemplary implementation of an annular lighting configuration with eight lighting portions;

FIGS. 7A-7E are diagrams illustrating various principles for illumination from lighting portions as directed to a central volume;

FIG. 9 is a diagram of an exemplary implementation of a portion of a metrology system including a first objective lens and an annular lighting configuration such as that of FIG. 8 which directs source light toward a first central volume which includes a first working distance focus position that corresponds to a first objective lens;

FIG. 10 is a diagram of the portion of the metrology system of FIG. 8 in which a second objective lens has been interchanged with/substituted for the first objective lens and including an annular optical configuration that is positioned in front of the annular lighting configuration so as to redirect the source light toward a second central volume which includes a second working distance focus position that corresponds to the second objective lens;

FIGS. 11A and 11B are diagrams of an exemplary implementation of a portion of a metrology system, including a first objective lens in FIG. 11A and a second objective lens in FIG. 11B, and an annular lighting configuration such as that of FIGS. 6A and 6B which directs source light toward a first central volume which includes a first working distance focus position and a first focus range that corresponds to the first objective lens as illustrated in FIG. 11A but does not include a second working distance focus position and second focus range that corresponds to the second objective lens as illustrated in FIG. 11B;

DETAILED DESCRIPTION

Figure 1:
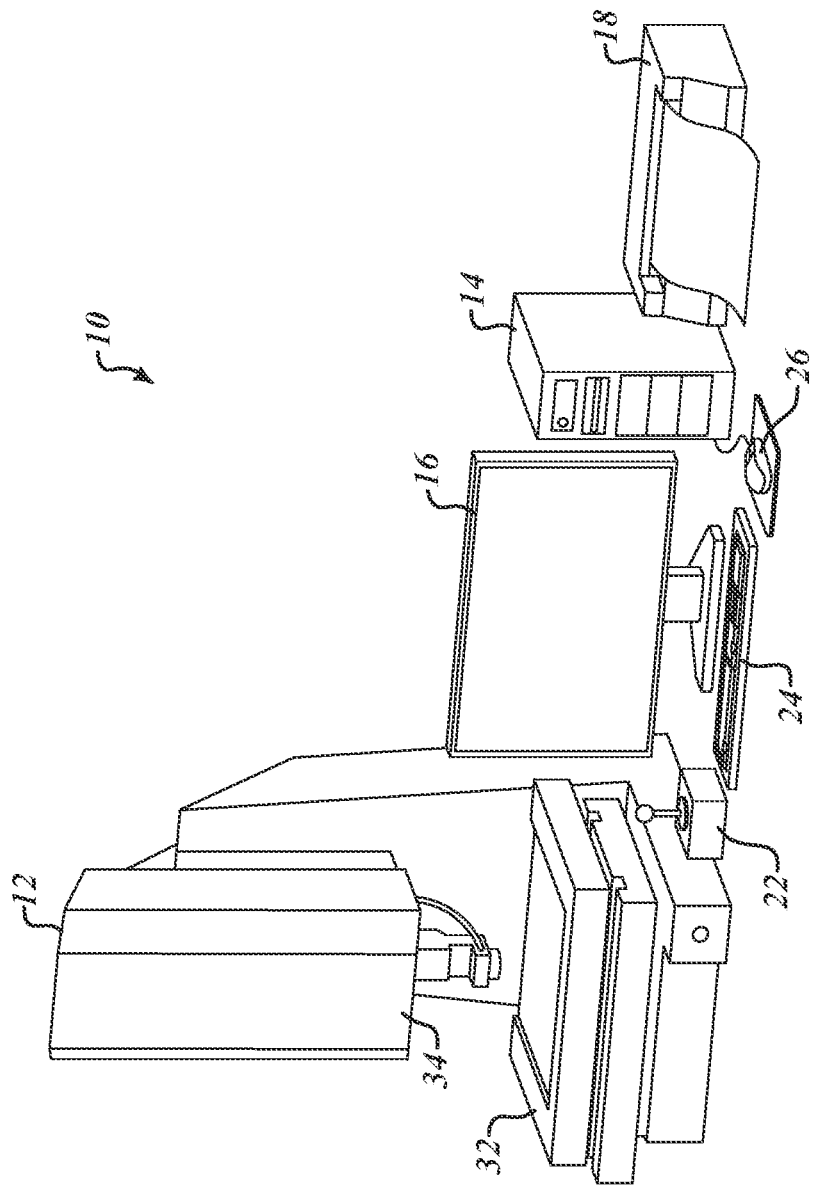
FIG. 1 is a diagram showing various typical components of a general-purpose precision machine vision metrology system.

FIG. 1 is a diagram showing various typical components of a general-purpose precision machine vision metrology system 10. The machine vision metrology system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision metrology system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 (and/or other control systems or control portions as described herein) may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision metrology system 10 are also described in commonly assigned U.S. Pat. Nos. 7,454,053; 7,324,682; 8,111,905; and 8,111,938, each of which is hereby incorporated herein by reference in its entirety.

As will be described in more detail below, for various applications (e.g., including in which a variable focal length (VFL) lens, such as a tunable acoustic gradient (TAG) lens, is utilized), it may be desirable to provide illumination from multiple directions, in order to better enable the imaging of certain workpieces (e.g., non-planar workpieces including at least some surfaces that are not orthogonal to an optical axis of the system, such as surfaces that may be angled/sloped and/or parallel, etc. in relation to the optical axis). As will be described in more detail below with respect to FIGS. 2 and 3, a lighting configuration (e.g., lighting configuration 230, 330, etc.) as described herein may include lighting portions which provide such illumination from multiple directions (e.g., as may function as or similarly to a ring light, etc.)

In various implementations, the source light as provided through the lighting portions is made to be uniform, including being imaged onto a workpiece or otherwise into a central volume so as to make a relatively uniform and dense illumination spot. It will be appreciated that in certain systems, relatively typical ring light illumination (e.g., which may typically use a large diverging beam incident on a workpiece) may in some instances be sufficient in part due to longer available integration times for images. For example, in some systems integration/exposure time may be relatively long (e.g., tens of milliseconds), for which the relatively typical ring illumination may be sufficient. In certain alternative systems, much shorter integration times may be required (e.g., utilizing one or more 100 nanosecond light pulses). In various implementations, a lighting configuration may be utilized that functions with relatively high efficiency and a desired level of uniformity of the illumination (e.g., in X and Y axis directions, as well as a Z axis direction, such as throughout a central volume CV).

Figure 2:
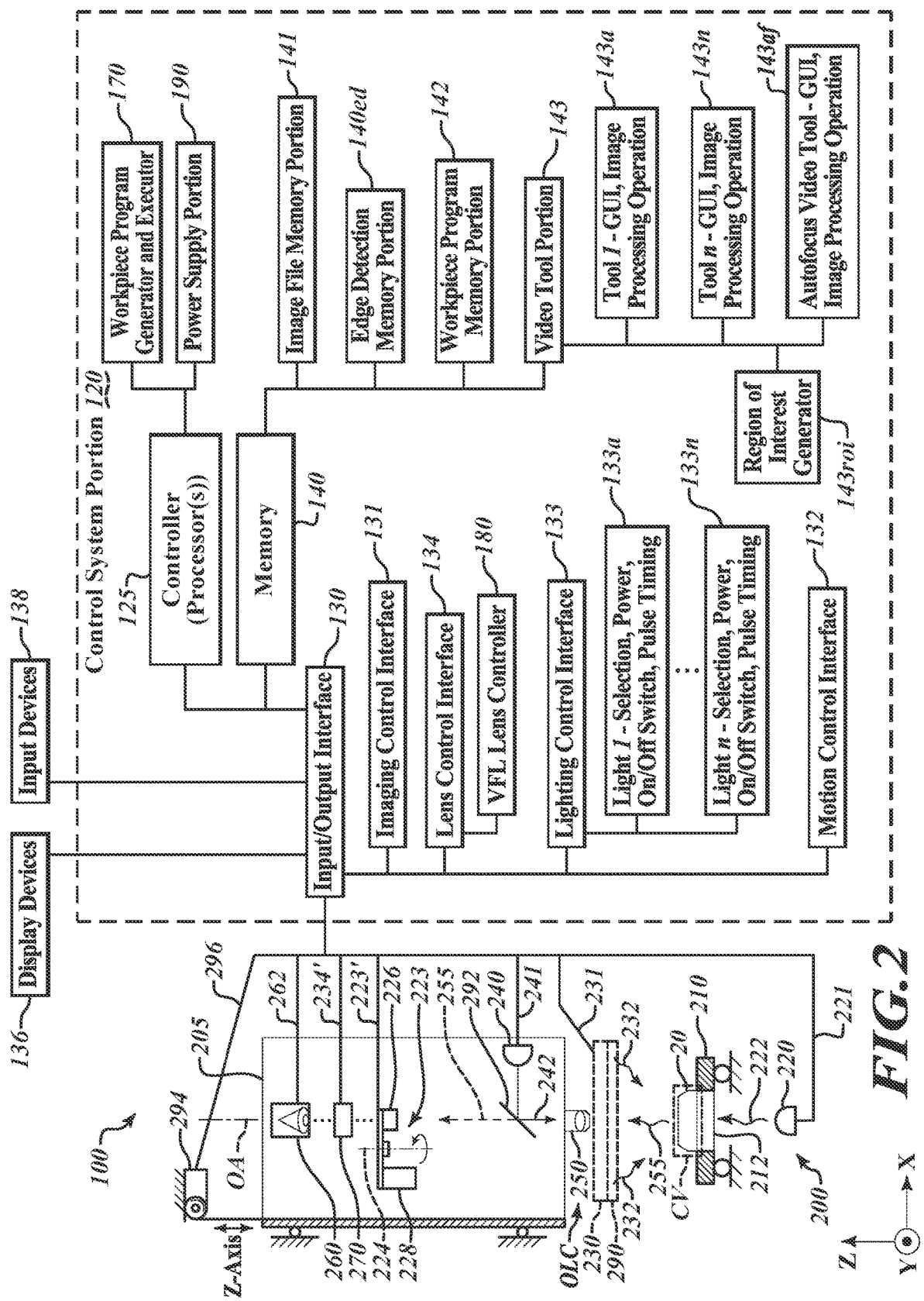
FIG. 2 is a diagram of a control system portion and a vision components portion of a machine vision metrology system similar to that of FIG. 1 and including certain features as disclosed herein.

FIG. 2 is a diagram of a control system portion 120 and a vision components portion 200 of a machine vision metrology system 100 similar to the machine vision metrology system of FIG. 1, including certain features as disclosed herein. As will be described in more detail below, the control system portion 120 is utilized to control the vision components portion 200, The vision components portion 200 includes an optical assembly portion 205, light sources 220, 230, 240, and a workpiece stage 210 having a central transparent portion 212. The workpiece stage 210 is controllably movable (e.g., along a X and/or Y axis that lie in a plane that is generally parallel to the surface of the stage where a workpiece 20 may be positioned, and/or in some implementations may also be movable along a corresponding Z axis that is orthogonal to the X and Y axes).

The optical assembly portion 205 includes a camera system 260 (i.e., including a camera), an objective lens configuration OLC (i.e., including an interchangeable objective lens 250) and a variable focal length (VFL) lens 270. In various implementations, the VFL lens 270 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system, and correspondingly of the metrology system in which it is included. The TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18. Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 that is included in the objective lens configuration OLC at a given time may be selected from a set of fixed magnification objective lenses that are included as part of the system (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable (e.g., along a Z axis that is generally orthogonal to the X and Y axes, and in some implementations may also be controllably movable along one or both of the X and Y axes) by using a controllable motor 294 that drives an actuator to move the optical assembly portion 205 (e.g., along the Z axis to change the focus of the image of a workpiece 20 or otherwise). The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205 and correspondingly of the overall metrology system 100. The lens control interface 134 may include a VFL lens controller 180 according to various principles, as described in greater detail below. A workpiece 20 may be placed on the workpiece stage 210. As described above, in various implementations the workpiece stage 210 may be controlled to move relative to the optical assembly portion 205 (e.g., such that the field of view of the interchangeable objective lens 250 moves between locations on a workpiece 20, and/or among a plurality of workpieces 20, etc.).

One or more of a stage light source 220, a lighting configuration 230, and a coaxial light source 240 may emit source light 222, 232, and/or 242, respectively, to illuminate a workpiece 20 or workpieces 20. The lighting configuration 230 may be formed in accordance with certain principles as described herein. In various exemplary embodiments, pulsed (e.g., strobed) illumination may be used. For example, during an image exposure, the lighting configuration 230 may emit strobed source light 232 toward a central volume CV in which at least part of the workpiece 20 is located. In another example, during an image exposure, the coaxial light source 240 may emit strobed source light 242 along a path including a beam splitter 292 (e.g., a partial mirror/reflective surface). The source light 232, 242 is reflected as image light 255, and the image light used for imaging passes through the interchangeable objective lens 250, the turret lens assembly 223 and the VFL (TAG) lens 270, and is received by the camera system 260. A workpiece image exposure, which includes the image of the workpiece (s) 20, is captured by the camera system 260, and is output on a signal line 262 to the control system portion 120.

In various implementations, the lighting configuration 230 includes a plurality of lighting portions configured to illuminate the workpiece 20 for producing image light 255, wherein each lighting portion is configured to direct light toward a central volume CV (e.g., in which at least part of the workpiece 20 may be positioned). As noted above, the objective lens 250 is configured to input image light 255 arising from the workpiece 20, wherein the objective lens 250 is configured to transmit the image light along an imaging optical path, and has an optical axis OA. In the example of FIG. 2, the objective lens 250 transmits the image light along the imaging optical path that passes through the VFL lens 270 to the camera 260. The camera 260 is configured to receive the image light transmitted along the imaging optical path and to provide images of the workpiece 20. As will be described in more detail below with respect to FIG. 3, a focus position EFP that corresponds to the focus of the images is configured to be variable within a focus range Refp along the optical axis. In various implementations, the lighting configuration 230 is controlled through a lighting control interface 133 (e.g., including a light controller portion for controlling the lighting configuration 230, such as light controller portion 133n).

Various light sources (e.g., the light sources 220, 230, 240) may be connected to the lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As will be described in more detail below, the objective lens configuration OLC is configured to include one objective lens 250 at a time out of a plurality of interchangeable objective lenses (e.g., which in certain examples below may be designated as a first objective lens 250-1, a second objective lens 250-2, etc.) Each objective lens may have a particular working distance and a corresponding working distance focus position. The annular lighting configuration 230 (e.g., when there is not an annular optical configuration 290 in front of it) may be configured to direct the source light 232 toward a first central volume CV (e.g., which includes a first working distance focus position) which may be utilized in combination with certain objective lenses (e.g., a first objective lens). When a different objective lens (e.g., a second objective lens) is interchanged into the objective lens configuration OLC (i.e., substituted for the first objective lens), the second objective lens may have different characteristics such as a different working distance and a corresponding working distance focus position. As will be described in more detail below, in order to have the source light 232 be directed toward a second central volume CV (e.g., that includes the working distance focus position of the second objective lens when the second objective lens is included in the objective lens configuration OLC), an annular optical configuration 290 is configured to be located in front of (e.g., inserted and/or otherwise positioned in front of) the annular lighting configuration 230 to redirect the source light 232 toward the second central volume CV (e.g., which includes the working distance focus position of the second objective lens when the second objective lens is included in the objective lens configuration OLC). This arrangement (e.g., including utilization of one or more annular optical configurations 290) enables the annular lighting configuration 230 (e.g., which as described herein provides source light 232 in a manner that is advantageous, such as in relation to the operation of the VFL lens 270, etc.) to be utilized in combination with different objective lenses having different characteristics such as different working distances and corresponding working distance focus positions.

As shown in FIG. 2, in various exemplary implementations, the control system portion 120 includes a controller 125 (e.g., comprising or operating as part of one or more processors), the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

Figure 3:
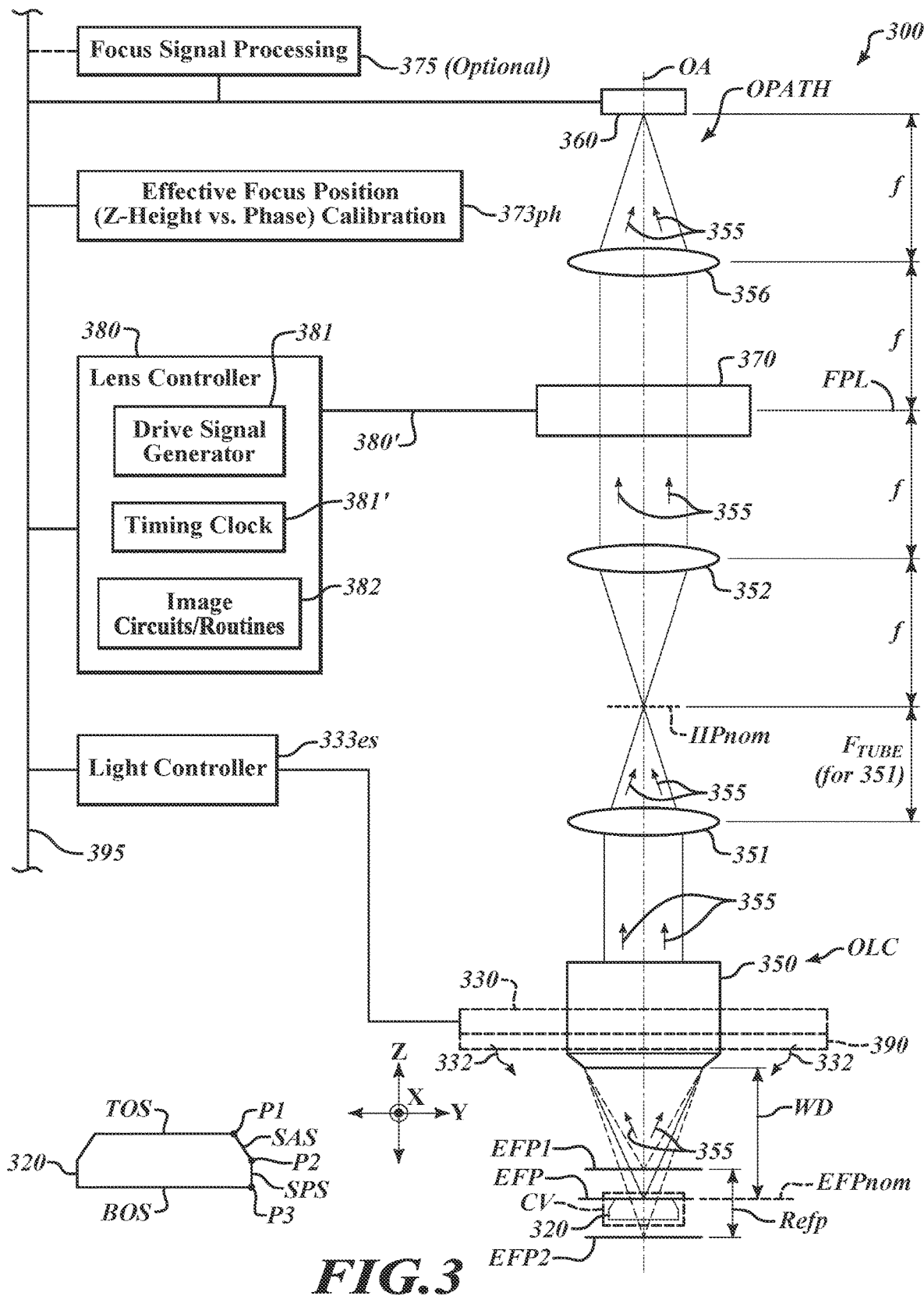
FIG. 3 is a diagram of an imaging system that may be adapted to a precision non-contact metrology system such as a machine vision metrology system and including certain features as disclosed herein.

The lighting control interface 133 may include lighting control elements 133a-133n that control, for example, the selection, power, on/off switch, and pulse/strobe timing, if applicable, for the various corresponding light sources of the machine vision metrology system 100, In various implementations, an instance of strobed illumination may be regarded as a type of pulsed illumination, as the terms are utilized herein. In some implementations, a light controller 333es as shown in FIG. 3 may provide pulse/strobe timing signals to one or more of the lighting control elements 133a-133n, such that they provide an image exposure pulse/strobe timing that is synchronized with a desired phase time of the VFL lens focus position modulation (e.g., in accordance with certain stored calibration data), and as described in greater detail below. In some implementations, the light controller 333es of FIG. 3 and one or more of the lighting control elements 133a-133n of FIG. 2 may be merged and/or indistinguishable.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143*af* that determines the GUI, image-processing operation, etc., for focus height (i.e., effective focus position (Z-coordinate/Z-height)) measurement operations. In various implementations, the autofocus video tool 143*af* may additionally include a high-speed focus height tool that may be utilized to measure focus heights with high speed using hardware illustrated in FIG. 3, as described in more detail in U.S. Pat. No. 9,143,674 as incorporated above. In various implementations, the high-speed focus height tool may be a special mode of the autofocus video tool 143*af* that may otherwise operate according to conventional methods for autofocus video tools, or the operations of the autofocus video tool 143*af* may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection/measurement operations, and/or to create and/or modify part programs, to view the images captured by the camera system 260, and/or to directly control the vision components portion 200.

In various exemplary implementations, when a user utilizes the machine vision metrology system 100 to create a part program for the workpiece 20, the user generates part program instructions by operating the machine vision metrology system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision metrology system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

FIG. 3 is a diagram of an imaging system 300 that may be adapted to a precision non-contact metrology system such as a machine vision metrology system and including certain features disclosed herein. It will be appreciated that certain numbered components 3XX of FIG. 3 may correspond to and/or provide similar operations or functions as similarly numbered components 2XX of FIG. 2, and may be similarly understood unless otherwise indicated. This numbering scheme to indicate elements having analogous design and/or function (i.e., unless otherwise illustrated and/or described) is also applied to the remaining figures herein.

As will be described in more detail below, an imaging optical path OPATH (also called a workpiece imaging optical path herein) comprises various optical components arranged along a path that conveys image light 355 from the workpiece 320 to the camera 360. The image light is generally conveyed along the direction of their optical axes OA. In the implementation shown in FIG. 3, all of the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the VFL lens 370 (which may be included in a 4f imaging configuration) and is utilized at least in part for imaging the workpiece 320 during a workpiece image exposure.

As shown in FIG. 3, the imaging system 300 includes an annular lighting configuration 330, a light controller 333*es*, an objective lens configuration OLC (i.e., configured to include at a given time one of a plurality of objective lenses 350), a tube lens 351, a relay lens 352, the VFL (TAG) lens 370, a relay lens 356, a lens controller 380, a camera 360, an effective focus position (Z-height vs. phase) calibration portion 373*ph*, a workpiece focus signal processing portion 375 (optional), and an annular optical configuration 390 (i.e., configured to be located/inserted/placed in front of the annular lighting configuration 330 when certain objective lenses 350 are included in the objective lens configuration OLC). In various implementations, the various components may be interconnected by direct connections or one or more data/control busses (e.g., a system signal and control bus 395) and/or application programming interfaces, etc. In various implementations, a Z-height (e.g., of a surface point on a workpiece) may correspond to and/or alternatively be referenced as a Z-coordinate, and/or a focus position, for which these terms may be utilized interchangeably in certain instances herein.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an image sensor) receives light transmitted along an imaging optical path OPATH through the VFL lens 370 during an image exposure and provides a corresponding camera image. The objective lens 350 of the objective lens configuration OLC inputs image light arising from a workpiece 320 during an image exposure, and transmits the image light along the imaging optical path OPATH through the VFL lens 370 to the camera 360 during the image exposure, to provide a workpiece image in a corresponding camera image. A system focus position EFP (aka an effective focus position EFP of the system) in front of the objective lens 350 during an image exposure corresponds to the optical power of the VFL lens 370 in combination with the objective lens 350 during that image exposure. The light controller 333es is configured to control an image exposure timing used for a camera image.

With respect to the example implementation shown in FIG. 3, the annular lighting configuration 330 is configured to emit the source light 332 (e.g., with pulsed/strobed illumination), either directly or as may be redirected by an annular optical configuration 390 (e.g., when positioned/inserted in front of the annular lighting configuration 330), toward a central volume CV including at least part of a workpiece 320. The objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, other light sources may illuminate the field of view in a coaxial or non-coaxial manner; for example, light sources 220 or 240 of FIG. 2.

In various implementations, the annular lighting configuration 330 of FIG. 3 includes a plurality of lighting portions configured to illuminate the workpiece 320 for producing the image light 355, wherein each lighting portion is configured to direct light 332, which may be redirected by an annular optical configuration 390, toward the central volume CV (e.g., in which at least part of the workpiece 320 may be positioned). The objective lens 350 is configured to input the image light 355 arising from the workpiece 320 and is configured to transmit the image light 355 along the imaging optical path OPATH, wherein the objective lens 350 has an optical axis OA. As will be described in more detail below, in various implementations the annular optical configuration 390 and/or the annular lighting configuration 330 may each include an open central area, for which the objective lens 350 may be partially inside the open central area(s) and/or through which the image light 355 may pass along the optical path OPATH (e.g., for which in various implementations the open central area(s) may not include any material in the imaging optical path OPATH or otherwise interfere with the image light 355 as it travels from the workpiece and through the objective lens along the optical path OPATH). The camera 360 is configured to receive the image light 355 transmitted along the imaging optical path OPATH and to provide images of the workpiece 320, wherein a system focus position EFP that corresponds to the focus of the images is configured to be variable within a focus range Refp along the optical axis OA.

As described herein, the objective lens configuration OLC is configured to include one objective lens 350 at a time out of a plurality of interchangeable objective lenses 350 (e.g., which in certain examples below may be designated as a first objective lens 350-1, a second objective lens 350-2, etc.) Each objective lens may have a particular working distance and a corresponding working distance focus position. As described herein, through the operation of the VFL lens 370, the system focus position oscillates between certain focus positions, for which the distance between those focus positions is indicated as a corresponding focus range (e.g., focus range Refp). Due to the different working distances of certain objective lenses, the utilization of a particular objective lens in combination with the VFL lens 370 will result in a corresponding focus range (e.g., as illustrated with respect to the focus ranges Refp1-Refp3 of FIGS. 11A-13, as will be described in more detail below).

The annular lighting configuration 330 (e.g., when an annular optical configuration 390 is not positioned in front of the annular lighting configuration) may be configured to direct the source light 332 toward a first central volume CV (e.g., which includes a first working distance focus position) which may be utilized in combination with certain objective lenses (e.g., a first objective lens). When a different objective lens (e.g., a second objective lens) is interchanged into the objective lens configuration OLC (i.e., substituted for the first objective lens), the second objective lens may have different characteristics such as a different working distance and a corresponding working distance focus position. As described herein, in order to have the source light 332 be directed toward a second central volume CV (e.g., that includes the working distance focus position of the second objective lens and at least part of a corresponding focus range when the second objective lens is included in the objective lens configuration OLC), an annular optical configuration 390 is configured to be located in front of (e.g., inserted and/or otherwise positioned in front of) the annular lighting configuration 330 to redirect the source light 332 toward the second central volume CV (e.g., which includes the working distance focus position of the second objective lens and at least part of the corresponding focus range when the second objective lens is included in the objective lens configuration OLC).

The lighting configuration 330 is controlled by a light controller 333es to direct the light 332 (e.g., as may be redirected by an annular optical configuration 390) toward the central volume CV for illuminating the workpiece 320. In various implementations, the light controller 333es is configured to control the VFL lens to periodically modulate the optical power of the VFL lens 370 over a range of optical powers at an operating frequency so as to vary the focus position of the system over a plurality of positions within the focus range Refp. In various implementations, the camera 360 is utilized to acquire an image stack comprising a plurality of images of the workpiece 320 (e.g., as described in more detail below with respect to FIGS. 4 and 5), wherein each image of the image stack corresponds to a different focus position along the optical axis OA (e.g., as each corresponding to a different Z-height in the example of FIG. 3). Focus curve data may be determined based at least in part on an analysis of the images of the image stack, wherein the focus curve data may indicate three dimensional positions of a plurality of surface points on the workpiece 320.

In the example of FIG. 3, an enlarged illustration of the workpiece 320 shown on the left includes a top orthogonal surface TOS, a bottom orthogonal surface BOS, a side angled surface SAS, and a side parallel surface SPS, for which each of the orthogonal, angled and parallel references are in relationship to the optical axis OA. A surface point P1 corresponds to a corner between a top orthogonal surface TOS and the side angled surface SAS, while a surface point P2 corresponds to a corner between the side angled surface SAS and the side parallel surface SPS, and a surface point P3 corresponds to a corner between the side parallel surface SPS and the bottom orthogonal surface BOS.

It will be appreciated that the light provided by the lighting configuration 330 as directed toward the workpiece 320 will illuminate each of the top orthogonal surface TOS, the side angled surface SAS, and the side parallel surface SPS, so as to enable imaging of each surface (i.e., as enabling corresponding determinations of three dimensional positions of surface points on each of the imaged surfaces, such as for surface points P1, P2 and/or P3). In relation to the side angled surface SAS and the side parallel surface SPS, it will be appreciated that with the non-coaxial illumination provided by the annular lighting configuration 330 from the different discrete directions as described herein, the side angled surface SAS and the side parallel surface SPS will be illuminated (e.g., with some of the light being scattered into the imaging system along the imaging optical path OPATH to enable determination/measurement of three dimensional positions of surface points on the side angled surface SAS and the side parallel surface SPS).

As described herein, the objective lens 350 is an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the VFL lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL lens 370. The VFL lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the lighting configuration 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance FTUBE of the tube lens 351 is illustrated as being approximately equidistant to a midpoint between the lenses 351 and 352, as is a focal distance f of the relay lens 352. In alternative implementations, the focal distance FTUBE for the tube lens 351 may be made to be different than the focal distance f of the relay lens 352 (which corresponds to one of the 4 f's of the 4f optical configuration).

In various implementations, the illustrated 4f optical configuration permits placing the VFL (TAG) lens 370 (e.g., which may be a low numerical aperture (NA) device) at the Fourier plane FPL of the objective lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380'. In various implementations, the imaging system 300 (which may also be referenced as a VFL lens system) may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the VFL lens 370, as well as controlling, monitoring and adjusting the driving and response of the VFL lens 370. In various implementations, the image circuits/routines 382 perform standard imaging operations for the optical system, synchronized with the phase timings of the VFL lens 370.

With respect to the general operations of the VFL lens 370, in various implementations as described above, the lens controller 380 may rapidly adjust or modulate the optical power of the VFL lens 370 periodically, to achieve a high-speed VFL lens that periodically modulates its optical power at a VFL lens resonant frequency (e.g., of 400 kHz, 250 kHz. 70 kHz, or 30 kHz, etc.). As shown in FIG. 3, by using the periodic modulation of a signal to drive the VFL lens 370, the effective focus position EFP of the imaging system 300 (that is, the focus position in front of the objective lens 350) may be rapidly moved within a range Refp (e.g., a focus range or an autofocus search range, etc.) bound by an effective focus position EFP1 (or EFPmax or peak focus distance Z1max+) corresponding to a maximum positive optical power of the VFL lens 370 in combination with the objective lens 350, and an effective focus position EFP2 (or EFPmin or peak focus distance Z1max−) corresponding to a maximum negative optical power of the VFL lens 370 in combination with the objective lens 350. In various implementations, the effective focus positions EFP1 and EFP2 may approximately correspond to phase timings of 90 degrees and 270 degrees.

In various implementations, a working distance WD of an objective lens may be defined as a distance between a front end of the objective lens and a working distance focus position WDFP (e.g., which may correspond to a position of a surface of a workpiece at which the sharpest focusing is obtained when there is zero optical power of the VFL lens 370 and/or a focal plane of the objective lens). For purposes of discussion, in various implementations the working distance focus position WDFP may correspond to an approximate middle of the range Refp which may be designated as EFPnom, and may approximately correspond to a focus position occurring for zero optical power of the VFL lens 370 in combination with the nominal optical power of the objective lens 350. According to this description, EFPnom may approximately correspond to the focus position at the nominal focal length of the objective lens 350 in some implementations (e.g., which may correspond to the focus position WDFP at the working distance WD of the objective lens 350 in some implementations).

In accordance with the above description (i.e., including that the effective focus positions EFP1 and EFP2 correspond to a maximum positive and negative optical power of the VFL lens 370 in combination with the objective lens 350), it will be appreciated that inclusion of different objective lenses 350 (e.g., which may have different working distances WD, etc.) in the objective lens configuration OLC may result in different corresponding effective focus positions EFP1 and EFP2 and corresponding ranges Refp. As described herein, it is desirable for the source light 332 from the annular lighting configuration 330 to be directed to a central volume that corresponds to (e.g., includes, etc.) a working distance focus position (i.e., corresponding to the focus position at the working distance WD, such as at or near EFPnom) and/or the effective focus position(s) EFP1 and/or EFP2 and/or at least part of the corresponding range Refp that results from the current objective lens 350 that is included in the objective lens configuration OLC. In order to achieve this, an annular optical configuration 390 is configured to be utilized in combination with a given objective lens while the given objective lens is included in the objective lens configuration OLC and to be located in front of the annular lighting configuration 330 to redirect the source light 332 toward a central volume CV which includes the working distance focus position of the given objective lens (e.g., and/or the corresponding effective focus position(s) EFP1 and/or EFP2 and/or at least part of the corresponding range Refp).

In some implementations, the optional focus signal processing portion 375 may input data from the camera 360 and may provide data or signals that are utilized to determine when an imaged surface region (e.g., including one or more surface points of a workpiece 320) is at an effective focus position. For example, a group of images acquired by the camera 360 at different effective focus positions (Z-heights), such as part of an image stack, may be analyzed using a known "maximum contrast" or "best focus image" analysis to determine when an imaged surface region of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (during the sweeping of multiple effective focus positions) of the VFL lens 370, and determine an image and/or image timing at which a target feature (e.g., including one or more surface points of a workpiece) is best focused.

In some implementations, the focus signal processing portion 375 may determine a phase timing corresponding to a best focus (e.g., of a workpiece feature) and output that "best focus" phase timing value to an effective focus position calibration portion 373ph. The effective focus position (Z-height vs. phase) calibration portion 373ph may store "phase" calibration data determined by calibration processes such as those disclosed in the incorporated references. The effective focus position calibration portion 373ph may provide effective focus position (Z-height vs. phase) calibration data that relates respective effective focus positions (Z-heights) to respective "best focus" phase timings within a period of a resonant frequency of the VFL lens 370. In various implementations, the associated recorded effective focus position (Z-height) calibration data 373ph may be merged with and/or indistinguishable from the lens controller 380, the workpiece focus signal processing portion 375, or a host computer system connected to the system signal and control bus 395, etc.

In various implementations, the light controller 333es controls an image exposure time of the imaging system 300 (e.g., relative to a phase timing of the periodically modulated effective focus position). More specifically, during an image exposure, the light controller 333es may use the effective focus position (Z-height) calibration data available in the effective focus position (Z-height vs. phase) calibration portion 373ph and control the lighting configuration 330 to pulse/strobe at a respective time. For example, the light controller 333es may control the lighting configuration 330 to pulse/strobe at a respective phase timing within a period of a standard imaging resonant frequency of the VFL lens 370, so as to acquire an image having a particular effective focus position within the sweeping (periodic modulation) range of the VFL lens 370 (e.g., as will be described in more detail below with respect to FIGS. 4 and 5). It will be appreciated that the operations of the light controller 333es and other features and elements outlined above may be implemented to govern workpiece image acquisitions.

Figure 4:
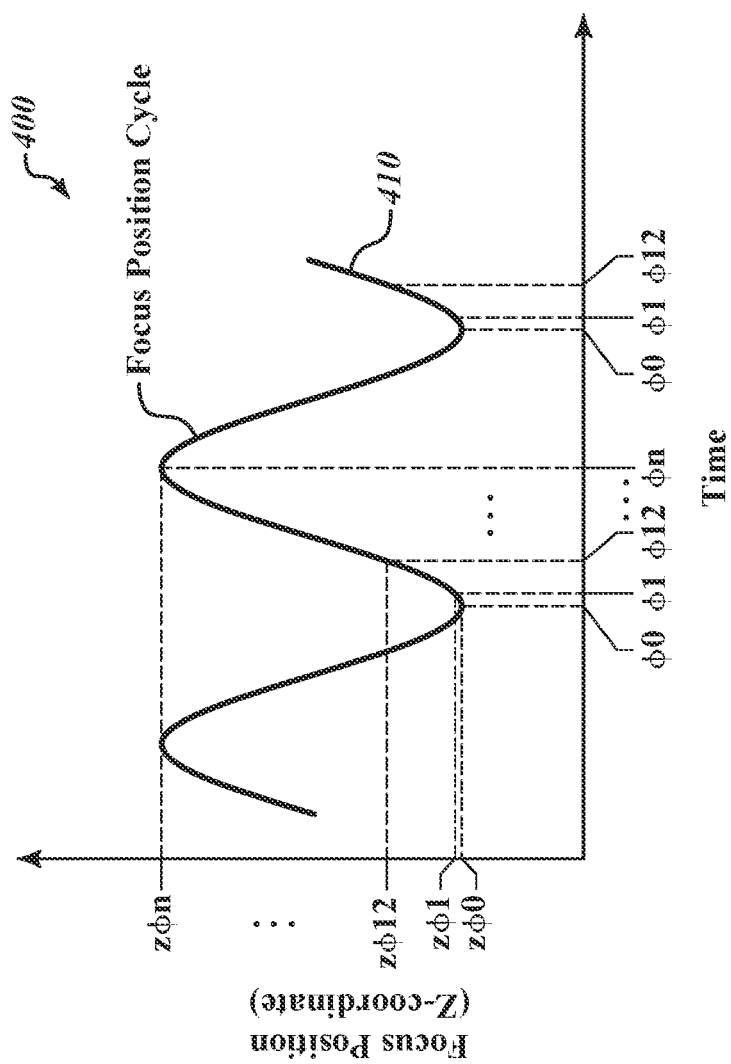
FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective focus position/Z-coordinate.

FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective Z-coordinate. In the illustrated example, each focus position has a corresponding Z-coordinate, for which an optical axis OA (e.g., of the objective lens 350) may define and/or otherwise be aligned (e.g., be coaxial or in parallel with, etc.) a Z-axis of a corresponding coordinate system (e.g., for which the Z-coordinates may alternatively be referenced as Z-axis coordinates and/or Z-heights). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like, such as stored in the calibration portion 373ph).

The diagram 400 also qualitatively shows how pulsed/strobed illumination can be timed to correspond with a respective phase timing (e.g., $\phi 0$, $\phi 1$, $\phi 12$, $\phi n$, etc.) of the periodically modulated focus position to expose an image focused at a respective Z-coordinate (e.g., $z\phi 0$, $z\phi 1$, $z\phi 12$, $z\phi n$, etc.) That is, in the illustrated example, while the camera 360 is acquiring an image during an integration period, if a pulse of illumination is short relative to the period of the focus modulation and is provided at the phase timing $\phi 0$, then the focus position will be at the Z-coordinate $z\phi 0$, and any workpiece surface/surface point that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at 30 frames per second, a single camera frame acquisition time may correspond to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

In relation to the principles described above with respect to FIG. 4, and as will be further described below with respect to FIG. 5, it will be appreciated that utilization of different objective lenses 350 in the objective lens configuration OLC may result in differences in the respective curves (e.g., in the amplitudes of the respective curves, etc.) More specifically, as noted above the utilization of different objective lenses 350 (e.g., which may have different working distances WD, etc.) in the objective lens configuration OLC may result in different corresponding effective focus positions EFP1 and EFP2 and corresponding ranges Refp. As a result, a focus position/Z-coordinate as corresponding to a particular phase timing may in some instances be greater or smaller, depending on the objective lens 350 that is currently included in the objective lens configuration OLC. In various implementations, such differences may be included in calibration data (e.g., as stored in the calibration portion 373ph), such as may correspond to each of the objective lenses 350 that may be included/utilized (e.g., as part of the plurality of objective lenses 350 of the system). It will also be appreciated that such differences are related to the importance of the source light 332 being properly directed (e.g., including in certain instances through utilization of an annular optical configuration 390) to a central volume CV that corresponds to the operation of the VFL lens 370 in combination with the current interchangeable objective lens 350 (e.g., in order to achieve the desirable imaging, measurement, etc. operations as described herein).

Figure 5:
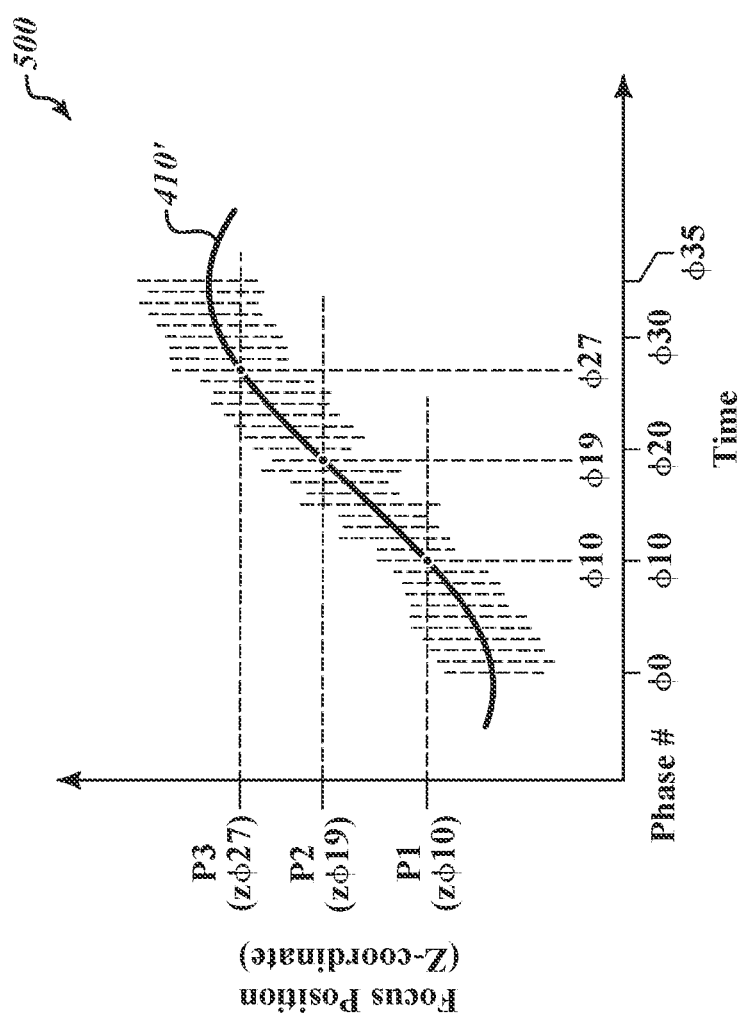
FIG. 5 is a chart showing an expanded portion of the periodically modulated focus position shown in FIG. 4, phase timings corresponding to those usable to collect an image stack, and also qualitatively showing how first, second and third instances of pulsed/strobed illumination that correspond with first, second and third phase timings of the periodically modulated focus position can be utilized to produce corresponding exposure images that provide image focus for surface points/workpiece features that are located at different focus positions/Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image stack (e.g., represented by the phase timing positions of the vertical dashed lines in the chart 500). FIG. 5 also qualitatively shows how first, second and third particular instances of pulsed illumination that correspond with first, second and third phase timings (e.g., in this particular example exemplary phase timings $\phi 10$, $\phi 19$ and $\phi 27$) of the periodically modulated focus position can be utilized to produce corresponding exposure images that provide image focus for workpiece features/surface points that are located at different Z-coordinates (e.g., such as a first surface point P1 located at a first Z-coordinate $Z\phi 10$, a second surface point P2 located at a second Z-coordinate $Z\phi 19$, and a third surface point P3 located at a third Z-coordinate $Z\phi 27$, such as may correspond to the surface points P1, P2 and P3 of the example of FIG. 3).

Regarding the phase timings corresponding to those usable to collect an image stack (represented by the phase timing positions of the vertical dashed lines in the chart 500), in accordance with principles as described herein, in one implementation an image stack (or multiple image stacks) may be acquired with respect to one or more regions of interest of a representative workpiece. For example, an image stack may be acquired by exposing a first image using one or more strobe illumination pulses (e.g., over one or more periods) coinciding with the phase timing $\phi 0$, A second image in the image stack may be similarly acquired using the phase timing $\phi 1$, and so on up to phase timing $\phi 35$ in the illustrated example. It will be understood that an image stack images a field of view using various focus positions, and generally can include any desired number of images with focus positions corresponding to desired Z-coordinates, acquired using corresponding phase timings.

As noted above, FIG. 5 illustrates in part how first, second and third particular instances of strobed illumination that correspond with first, second and third phase timings (e.g., the exemplary phase timings $\phi 10$, $\phi 19$ and $\phi 27$) of the periodically modulated focus position can be utilized to produce corresponding exposure images that provide image focus for surface points that are located at different Z-coordinates (e.g., such as a first surface point P1 located at a first Z-coordinate $Z\phi 10$, a second surface point P2 located at a second Z-coordinate $Z\phi 19$, and a third surface point P3 located at a third Z-coordinate $Z\phi 27$).

As illustrated in FIG. 5, the first, second and third surface points in the field of view on a representative workpiece (e.g., workpiece 320) are indicated as having a sufficient image focus in respective images of an image stack. The first surface point P1 is indicated as being best or sufficiently focused at a Z-coordinate $Z\phi 10$ which corresponds to a phase timing of $\phi 10$, and the second surface point P2 is indicated as being best or sufficiently focused at a Z-coordinate $Z\phi 19$ which corresponds to a phase timing of $\phi 19$, and a third surface point P3 is indicated as being best or sufficiently focused at a Z-coordinate $Z\phi 27$ which corresponds to a phase timing of $\phi 27$. In various implementations, the contrast in one or more regions of interest may be analyzed (e.g., according to known methods) in each image of an image stack. Utilizing such processes, the particular images and/or interpolated Z-coordinates indicated as providing the best or sufficient contrast and focus for the first, second and third surface points P1, P2 and P3, respectively, may be determined.

In various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image stack, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image stacks and focus curves are taught in U.S. Pat. Nos. 8,581,162; 9,060,117 and 10,880,468, each of which is hereby incorporated herein by reference in its entirety.

In some implementations, the processing including the obtaining of the image stack may be referenced as a type of points-from-focus (PFF) process, as utilized to determine Z-coordinates of points on the workpiece surface. The PFF image stack may be processed to determine or output a Z-coordinate map (e.g. a point cloud) that quantitatively indicates a set of 3 dimensional surface coordinates (e.g., corresponding to a surface shape or profile of the workpiece). In such a PFF type analysis, in some implementations each focus curve may correspond to a single point or X, Y location on the workpiece surface. That is, the peak of each focus curve may indicate the Z-coordinate of the single point along the direction of the optical axis OA of the system. In various implementations, the PFF type analysis repeats this process for multiple surface points (e.g., each with a corresponding region of interest) across the workpiece surface such that an overall profile of the workpiece surface can be determined. In general, the process may be performed for multiple surface points that are within a field of view (i.e., as captured within the images of the image stack), where for each image of the image stack, a particular ROI (i) may correspond to an X, Y location (e.g., as may correspond to a particular point) on the workpiece surface (e.g., with the point at the center of the ROI).

As indicated above, in various implementations, the analysis of an image stack includes determining focus curve data for the image stack which indicates a focus position at which a surface point is in focus (e.g., as may correspond to a local peak or other characteristic of the focus curve). For example, the focus curve data may indicate a first focus position (e.g., corresponding to a Z-coordinate $Z\phi10$, which may also be referenced as Z1) at which the first surface point P1 is in focus, a second focus position (e.g., corresponding to a Z-coordinate $Z\phi19$, which may also be referenced as Z2) at which the second surface point P2 is in focus, and a third focus position (e.g., corresponding to a Z-coordinate $Z\phi27$, which may also be referenced as Z3) at which the third surface point P3 is in focus.

In addition to the determinations/indications of the Z-coordinates of each of the surface points, the focus curves may each correspond to particular X and Y coordinates. For example, in one implementation the surface point P1 may be in a first region of interest (e.g., as centered in the first region of interest) of the images of the image stack as corresponding to a field of view, for which the first region of interest may be associated with X and Y coordinates which also correspondingly indicate the X and Y coordinates (e.g., X1 and Y1) of the surface point P1. Similarly, the surface point P2 may be in a second region of interest (e.g., as centered in the second region of interest) of the images of the image stack as corresponding to the field of view, for which the second region of interest may be associated with X and Y coordinates which also correspondingly indicate the X and Y coordinates (e.g., X2 and Y2) of the surface point P2. In some instances, the surface point P3 may be in the same region of interest as the second surface point (i.e., the second region of interest) of the images of the image stack as corresponding to the field of view, and may have the same or similar X and Y coordinates (e.g., X3=X2 and Y3=Y2) as the surface point P2, but for which the surface points P2 and P3 may have different Z coordinates (e.g., Z2 and Z3, respectively). In various implementations, the Z coordinates Z2 and Z3 may be determined based on local focus peaks within a single focus curve and/or based on other known techniques.

Thus, the focus curve data, as based at least in part on an analysis of the images of the image stack, indicates 3 dimensional positions (e.g., X, Y, Z coordinates) of a plurality of surface points on the workpiece. In the specific examples above, the focus curve data indicates three dimensional positions of the surface points P1, P2 and P3 as corresponding to determined coordinates (X1, Y1, Z1), (X2, Y2, Z2) and (X3, Y3, Z3), respectively (e.g., for which such analysis/determinations for the Z coordinates/Z-heights as noted above may include utilization of calibration data, such as that stored in calibration portion 373$ph$, for which particular calibration data may be associated with a particular objective lens 350 that is currently included in the objective lens configuration OLC). In various implementations, a measurement related to the surface points may additionally be made based on an analysis of the focus curve data. For example, a distance between the surface points P1 and P2, or P2 and P3, may be determined based on an analysis of the focus curve data (e.g., in relation to the determined three-dimensional coordinates and known techniques for determining distances between such three-dimensional coordinates).

In general, for certain workpieces (e.g., with non-planar surfaces, etc.), it may be desirable to provide illumination from multiple directions in order to better image workpiece surfaces (e.g., workpiece surfaces that are non-orthogonal to the optical axis) such as with slopes/angled surfaces, such as sidewalls (e.g., workpiece surfaces that are angled relative to, or nominally parallel with, the optical axis), etc. In certain implementations, illumination from multiple directions may be provided by conventional ring illumination (e.g., utilizing a ring light made from a single circular florescent bulb, or for which a light source may be guided by a fiber bundle with the output of the fiber bundle arranged into a ring geometry). In certain implementations, typical ring illumination may be characterized as generating light in multiple directions, including in relation to a workpiece, from a fixed inclination (e.g., according to an angle $\theta$) and in all azimuthal directions (e.g., according to angles $\varphi$). However, some implementations utilizing conventional ring illumination may for certain applications be regarded as relatively inefficient (e.g., power inefficient). In certain implementations (e.g., such as illustrated in FIGS. 6A and 6B), an annular lighting configuration may provide illumination from multiple discrete directions. Such configurations may in some instances be characterized as approximating ring illumination (e.g., in an annular arrangement), with light provided in a number of discrete azimuthal directions.

In various implementations, different numbers of lighting portions may be included as part of a lighting configuration, as will be described in more detail below. For example, in the implementation of FIGS. 6A and 6B, eight lighting portions are utilized to provide light from eight discrete azimuthal directions, while in the implementation of FIGS. 8-10, over fifty lighting portions may be utilized (e.g., to provide light in a corresponding number of discrete azimuthal directions). In various implementations, an annular lighting configuration may include at least four lighting portions. As illustrated in FIG. 6B, for each of the lighting portions, the light is provided from a fixed inclination (e.g., corresponding to an angle $\theta1$) and eight corresponding discrete azimuthal directions (e.g., each corresponding to an angle $\varphi$). Such configurations may correspond to high efficiency for providing the illumination, while also providing desirable imaging capability for angled or other workpiece surfaces (e.g., surfaces that are not orthogonal to the optical axis). It is further noted that the desirable illumination (e.g., as properly directed/redirected, such as in some instances including utilization of an annular optical configuration 390) and resulting accurate imaging of such workpiece surfaces enables highly accurate determinations/measurements of three-dimensional positions of the surface points on the workpiece (e.g., in accordance with points-from-focus and/ or other processes that may be performed for determining three dimensional positions of surface points, etc.)

FIGS. 6A and 6B illustrate top view and a side view, respectively, of a lighting configuration 330' which includes eight lighting portions 330A-330H, which are configured to illuminate the workpiece 320 for producing image light (e.g., as described above with respect to FIGS. 2 and 3). In various implementations, each lighting portion may include an imaging lens portion as well as certain other components (e.g., including one or more mirror portions for directing light toward the central volume CV). In certain implementations, a respective optical fiber 335A-335H may provide light to each of the respective lighting portions 330A-330H from a light source (e.g., which may be a single light source for all of the optical fibers in some instances).

As illustrated in FIGS. 6A and 6B, the lighting portions 330A-330H are distributed in an arrangement in which each lighting portion is configured to direct light toward the central volume CV (e.g., in which at least part of a workpiece 320 to be imaged, measured, etc. may be located). The light directed toward the central volume CV by each of the imaging lens portions of the lighting portions 330A-330H (or as redirected toward a central volume CV by an annular optical configuration as disclosed herein) is configured to overlap and to form a nominally uniform intensity of illumination within at least part of the central volume CV, such that the intensity of the illumination within the central volume CV is configured to be nominally the same at a plurality of focus positions. As described herein, the central volume CV may correspond to the operation of the VFL lens 370 in combination with a current interchangeable objective lens 350 that is included in the objective lens configuration OLC. In the example of FIGS. 6A and 6B (i.e., in which an annular optical configuration 390 is not currently shown as being located in front of the annular lighting configuration 330'), the objective lens may be a first objective lens 350-1 that is included in the objective lens configuration OLC. Other examples (e.g., such as with first, second or third objective lenses 350-1, 350-2, 350-3 that may be included in the objective lens configuration OLC) will be described in more detail below with respect to FIGS. 9-13.

In accordance with the arrangement of FIGS. 6A and 6B, each lighting portion 330A-330H directs light 332A-332H in a direction DIR-A to DIR-H, respectively. In FIG. 6B, for simplicity of the illustration, only the light 332A and 332E from the lighting portions 330A and 330E are illustrated as directed in the directions DIR-A and DIR-E, respectively. As used herein, the term "nominally" encompasses variations of one or more parameters that fall within acceptable tolerances. As an example, in one implementation a term such as "nominally uniform intensity of illumination" in a central volume may indicate that there is an approximately uniform intensity of illumination as corresponding to a minimal variance of the intensity of the illumination within the central volume (e.g., such as a variance of less than 5%, or less than 2%, or less than 1%, such as in accordance with acceptable tolerances, etc.)

In the example of FIGS. 6A and 6B, the arrangement in which the lighting portions are distributed is an annular arrangement in which each lighting portion is located at a different angular position within the annular arrangement. In relation to a 360 degree reference for positioning within the annular arrangement, the eight lighting portions 330A-330H are located at 45 degree increments around the 360 degree annular reference configuration (e.g., as each corresponding to a respective angle $\varphi$, such as an angle $\varphi_A$ of 0 degrees for lighting portion 330A, an angle $\varphi_B$ of 45 degrees for lighting portion 330B, an angle $\varphi_C$ of 90 degrees for lighting portion 330C, etc.)

As noted above, it is generally desirable within the central volume CV to have uniform illumination in both the X and Y axis directions, as well as the Z-axis direction (e.g., to best enable/support points-from-focus type processes or similar processes, such as for determining three dimensional positions of surface points on a workpiece, etc., for which focus positions/Z-heights may be determined in accordance with maximum contrast determinations, etc., as described above with respect to FIGS. 4 and 5, etc.). It will be appreciated that the aspect of uniform illumination in the Z-axis direction in particular has not typically been addressed in certain prior systems, and is related to the focus range $\Delta z$, as may be part of or otherwise correspond to the focus range Refp (e.g., in accordance with the operation of the VFL lens 370 in combination with the interchangeable objective lens 350 that is currently included in the objective lens configuration OLC) as part of the points-from-focus type operations (e.g., for determining three-dimensional positions of surface points based at least in part on contrast calculations in relation to images in an image stack, etc.). As related to such aspects, it will be appreciated that uniform illumination in the Z-axis direction may be maintained when an annular optical configuration 390 as disclosed herein is located in front of the annular lighting configuration. It is also desirable for the system to be highly efficient (e.g., due to the power limitations of the relatively short light pulses, such as 100 nanosecond light pulses, as described above with respect to FIGS. 4 and 5, etc., and in some instances what may be a relatively low capture efficiency for light scattering off of the surfaces of the workpiece).

FIG. 7A illustrates a camera field of view FOV-CAM at a single working distance. FIG. 7B illustrates desirable illumination spot dimensions at the nominal working distance. It is noted that the shape of the illumination spot portion ILSP as illustrated in FIG. 7B, as well as the minimum spot size MINSS are well matched to a projected circle as imaged off-axis (e.g., with an elliptical cross-section). FIGS. 7C and 7D illustrate field of view characteristics within a volume (e.g., within a cylindrical volume of the central volume CV, such as illustrated in FIG. 7E).

In relation to FIGS. 7A-7E, it is desirable for the illumination spot portion ILSP to be of sufficient dimensions and size, including at least a minimum spot size MINSS, so that when the light is directed from any of the angles of the lighting portions (e.g., and as may in some instances be redirected by an annular optical configuration 390) toward the central volume CV, the light will at least cover a common circular field of view FOV-CIR, at all focus positions within a focus range (e.g., $\Delta z$, such as may include or otherwise correspond to all or part of a focus range Refp, etc.). The central volume CV may include at least a cylindrical volume (e.g., with a height defined by the $\Delta z$ dimension and for which the parallel circular bases each correspond to the area of the circular field of view FOV-CIR).

In FIG. 7A, one specific example of a camera field of view FOV-CAM is illustrated in accordance with a rectangular area in a first orientation (e.g., as corresponding to a rectangular pixel array and/or other rectangular sensor area of a camera). It will be appreciated that the camera field of view FOV-CAM may be made to rotate in some implementations (e.g., by rotating the camera, etc.), for which it may be desirable to define a circular field of view FOV-CIR which accommodates all possible orientations of the camera field of view FOV-CAM, as rotated through 360 degrees (e.g., around the optical axis OA). In various implementations, even if the camera is not rotatable or does not rotate for a particular application, it may still be desirable to define the circular field of view FOV-CIR which accommodates a current orientation of the camera field of view FOV-CAM (e.g., as illustrated).

In FIG. 7B, an illumination spot portion ISLP is illustrated as having been formed by a first lighting portion directing light in a first direction toward the central volume CV. In order to illustrate a comparative size, the circular field of view FOV-CIR is illustrated at the center of the illumination spot portion ILSP. Also illustrated is a minimum spot size MINSS, as might be employed to produce illumination for covering the size of the circular field of view FOV-CIR, at each focus position within a focus range Δz, as will be described in more detail below with respect to FIGS. 7C and 7D.

FIG. 7C is a diagram illustrating light directed in a first direction DIR-1 toward a central volume CV. In certain implementations, the light may be provided from a first lighting portion (e.g., lighting portion 330A of FIGS. 6A and 6B, such as with DIR-1 corresponding to DIR-A, or for which DIR-1 may correspond to the direction of the light as redirected by a respective optical portion of an annular optical configuration 390 as disclosed herein). As illustrated, in order for the illumination spot portion ILSP to cover the circular field of view FOV-CIR at each focus position within the focus range Δz (e.g., with the circular field of view FOV-CIR illustrated at certain focus positions by dotted-lines), the illumination spot portion ILSP may be elongated (e.g., in a shape of an ellipse). As illustrated, the illumination spot portion ILSP is of sufficient dimensions such that it covers the circular field of view FOV-CIR within a cylindrical volume of the central volume CV, at each focus position within the focus range Δz.

FIG. 7D illustrates similar principles for light directed by a second lighting portion (e.g., lighting portion 330E of FIGS. 6A and 6B, such as with DIR-2 corresponding to DIR-B, or for which DIR-2 may correspond to the direction of the light as redirected by a respective optical portion of an annular optical configuration 390 as disclosed herein). For the light directed in the direction DIR-2, the illumination spot portion ILSP is illustrated as being of sufficient dimensions, such that it covers the circular field of view FOV-CIR within a cylindrical volume of the central volume CV, at each focus position within the focus range Δz.

FIG. 7E illustrates the cylindrical volume of the central volume CV. As illustrated, the cylindrical volume has a height corresponding to the dimension Δz, and for which the parallel circular bases of the cylindrical volume each correspond to the area of the circular field of view FOV-CIR. In accordance with principles as described herein, the illumination within the cylindrical volume/central volume CV may be nominally uniform, in both the X and Y axis directions, as well as the Z axis direction (e.g., as may be beneficial for certain applications, such as those including points-from-focus processes, etc.)

More specifically, the light directed toward the central volume CV by the imaging lens portions of the lighting portions may be configured to overlap and to form a nominally uniform intensity of illumination within at least part of the central volume CV, such that the intensity of the illumination within the central volume CV is configured to be nominally the same at a plurality of focus positions (e.g., with the circular field of view FOV-CIR illustrated at certain focus positions by dotted-lines in FIGS. 7C and 7D). In one specific example, each image of an image stack may correspond to one of the focus positions of the plurality of focus positions.

Within the cylindrical volume of the central volume CV, it will be appreciated that the uniformity of the illumination, both in the X and Y axis directions, as well as in the Z axis direction, provides certain advantages. In particular, as described above with respect to FIGS. 4 and 5, for points-from-focus type operations (e.g., as performed utilizing the VFL lens 370, which may be a high-speed TAG lens, etc.), the determinations/measurements of the three-dimensional positions of surface points are made based at least in part on contrast determinations. As a generalization, it may be noted that when surface points are in a "best focus" position, they may generally have a highest contrast in an image (e.g., as compared to other images of an image stack), for which a Z-height/focus position of the surface point may be determined/measured in accordance with such determination as part of a points-from-focus process. As part of such processes, uniform illumination (i.e., in X and Y axis directions, as well as the Z axis direction) is beneficial, in that non-uniform illumination may otherwise negatively affect the contrast determinations. More specifically, determination of the contrast may be affected by non-uniform illumination (e.g., where if non-uniform illumination is utilized, then different surface points at a same Z-height may nonetheless be associated with different levels of contrast due to different levels of illumination, which may incorrectly indicate different Z-heights for the respective surface points, etc.)

Thus, it is desirable to have nominally uniform illumination throughout the central volume CV, so as to best enable accurate contrast determinations for surface points on the workpiece (e.g., as primarily indicative of the Z-height/focus position of the surface points, as opposed to also being affected by varying levels of non-uniform illumination). As also indicated by the above description in relation to FIGS. 4 and 5, in order to capture imagines in an image stack as corresponding to particular focus positions (e.g., as corresponding to Z-heights), it is desirable to provide short pulses of illumination (e.g., as provided by all of the lighting portions of the lighting configuration simultaneously) at specific phase timings (e.g., as corresponding to particular focus positions). As part of such operations, it is desirable for the light provided during the short pulses to have a high intensity (high brightness), for best illuminating the workpiece (e.g., including the workpiece surfaces that may be angled or otherwise non-orthogonal to the optical axis) for best illuminating and imaging the various types of surfaces of the workpiece. Thus, high efficiency of the system in this regard is also desirable.

Figure 8:
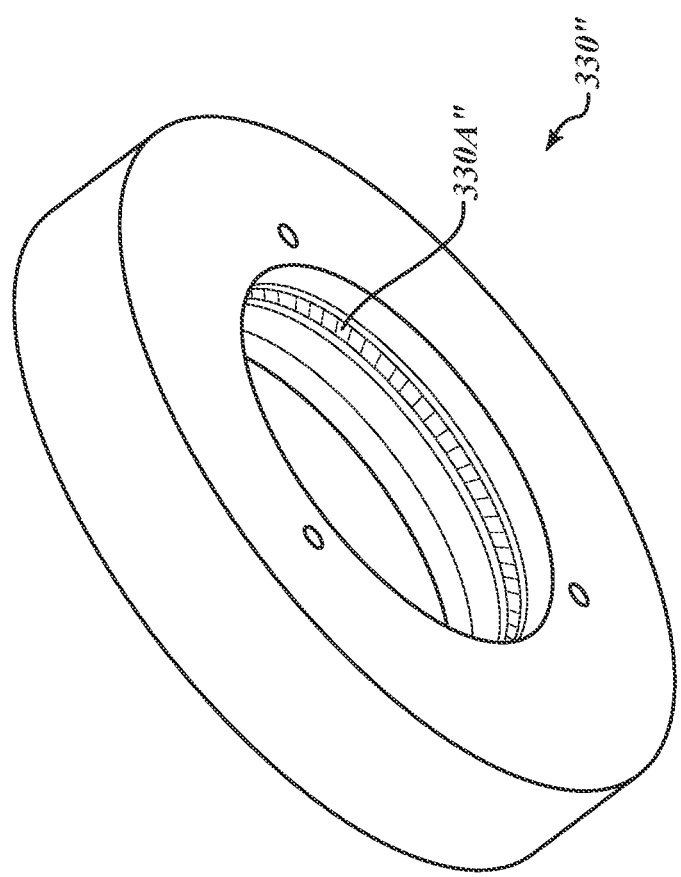
FIG. 8 is a diagram of an exemplary implementation of an annular lighting configuration with over fifty lighting portions.

FIG. 8 is a diagram of an exemplary implementation of an annular lighting configuration 330" with over fifty lighting portions. In various implementations, the annular lighting configuration 330" may have certain similarities to the annular lighting configuration 330' of FIGS. 6A and 6B, and may be understood to operate similarly, except as otherwise described below. In FIGS. 8-10, a representative lighting portion 330A" of the annular lighting configuration 330" is indicated (e.g., as may be understood in comparison to the lighting portion 330A of FIGS. 6A and 6B) and for which it will be understood that the remaining lighting portions may have similar features. In certain implementations, each of the lighting portions may have a light source (e.g., as provided by a corresponding optical fiber, such as the optical fibers 335 of FIG. 6A) and/or a lens for focusing the light (e.g., in one implementation the annular lighting configuration 330" may include an array of lenslets, with one lenslet corresponding to each of the lighting portions, such as one lenslet corresponding to the representative lighting portion 330A"). In one specific example of an implementation, the annular lighting configuration 330" may include 64 lighting portions.

FIG. 9 is a diagram of an exemplary implementation of a portion of a metrology system (e.g., such as that of FIGS. 1-3) including a first objective lens 350-1 and an annular lighting configuration 330" such as that of FIG. 8 which directs source light toward a first central volume CV1 which includes a first working distance focus position WDFP1 that corresponds to the first objective lens 350-1 (i.e., having a corresponding first working distance WD1).

FIG. 10 is a diagram of the portion of the metrology system of FIG. 9 in which a second objective lens 350-2 has been interchanged with/substituted for the first objective lens 350-1 and including an annular optical configuration 390 that is positioned in front of the annular lighting configuration 330" so as to redirect the source light toward a second central volume CV2 which includes a second working distance focus position WDFP2 that corresponds to the second objective lens 350-2 (i.e., having a corresponding second working distance WD2).

In more detail, FIGS. 9 and 10 show side views illustrating the annular lighting configuration 330" which includes over 50 lighting portions, including representative lighting portion 330A", which are configured to illuminate the workpiece 320 for producing image light (e.g., as described above with respect to FIGS. 2 and 3). As illustrated in FIGS. 9 and 10 the lighting portions are distributed in an arrangement in which each lighting portion is configured to direct light toward the central volume CV (e.g., in which at least part of the workpiece 320 may be located). The light directed toward the central volume CV by each of the imaging lens portions of the lighting portions (or as redirected toward a central volume CV by an annular optical configuration 390 as shown in FIG. 10) is configured to overlap and to form a nominally uniform intensity of illumination within at least part of the central volume CV, such that the intensity of the illumination within the central volume CV is configured to be nominally the same at a plurality of focus positions (e.g., as described above with respect to FIGS. 7A-7E). As described herein, the central volume CV may correspond to the operation of the VFL lens 370 (see FIG. 3) in combination with a current interchangeable objective lens 350 that is included in the objective lens configuration OLC.

In the example of FIG. 9, the annular lighting configuration 330" is configured to direct source light 332 toward a first central volume CV1 which includes the first working distance focus position WDFP1 that corresponds to the first objective lens 350-1 (i.e., having a corresponding first working distance WD1). In accordance with the arrangement of FIG. 9, each lighting portion directs at least some of the source light 332 in a respective direction at a first angular orientation φ1, For simplicity of the illustration, only the light 332A1 from the representative lighting portion 330A" of the annular lighting configuration 330" is illustrated, and at least some of the light 332A1 is directed in the direction DIR-A1 at the first angular orientation φ1.

The illustrated arrangement in which the lighting portions are distributed is an annular arrangement in which each lighting portion is located at a different angular position within the annular arrangement. In relation to a 360 degree reference for positioning within the annular arrangement, the multiple lighting portions are located at determined degree increments around the 360 degree annular reference configuration (e.g., as each corresponding to a respective angle φ, such as discussed above with respect to FIGS. 6A and 6B).

In some implementations, each lighting portion of the plurality of lighting portions may comprise an optical fiber (see optical fibers 335A-335H of FIG. 6A) that provides source light 332 and a lens that is configured to direct at least some of the source light 332 from the optical fiber 335 in a first angular orientation θ1 toward the first central volume CV1 when the annular optical configuration 390 is not positioned in front the annular lighting configuration 330 to redirect the source light 332. In some implementations, a first light source may provide the source light 332 to all of the optical fibers 335 of the plurality of lighting portions (e.g., in various implementations the first light source may be part of light controller 333es of FIG. 3, or part of the lighting configuration 330, or as a separate component, such as may be controlled by the light controller 333es, or otherwise).

As noted above, it is generally desirable within the central volume CV corresponding to a currently included/employed objective lens 350 to have uniform illumination in the X, Y and Z axis directions over at least a portion of the central volume CV, as well as for the system to be highly efficient. As illustrated in FIGS. 9 and 10, the first central volume CV1 does not include the second working distance focus position WDFP2 that corresponds to the second objective lens 350-2, and the second central volume CV2 does not include the first working distance focus position WDFP1 that corresponds to the first objective lens 350-1.

With reference to the example of FIG. 9, the use of the annular lighting configuration 330" without including the annular optical configuration 390 (i.e., the annular optical configuration 390 is not positioned or inserted in front of the annular lighting configuration 330") when the first objective lens 350-1 is included in the objective lens configuration OLC facilitates providing nominally uniform illumination in the X, Y and Z axis directions in at least a portion of the central volume CV1 at a plurality of focus positions, as well as for the system to be highly efficient when the first objective lens 350-1 is included in the objective lens configuration OLC.

As indicated in FIG. 10, once the annular optical configuration 390 is located/inserted in front of the annular lighting configuration 330" (i.e., in the view of FIG. 10 the annular optical configuration 390 is located below the annular lighting configuration 330" and is in front of the annular lighting configuration 330", so as to be in the path of the light 332 from each of the lighting portions). For example, in relation to the lighting portion 330A", the annular optical configuration 390 redirects at least some of the source light 332A1 as source light 332A2 (which is the same light although as redirected) in the direction DIR-A2 and at a second angular orientation θ2 toward the second central volume CV2. The use of the annular optical configuration 390 in combination with the second objective lens 350-2 as positioned or inserted to be located in front of the annular lighting configuration 330" to redirect the source light 332A, etc. facilitates providing nominally uniform illumination in the X, Y and Z axis directions in at least a portion of the central volume CV2 at a plurality of focus positions, as well as for the system to be highly efficient when the second objective lens 350-2 is included in the objective lens configuration OLC.

In various implementations, different mechanisms and/or holding portions may be utilized for locating/inserting the annular optical configuration 390 in front of the annular lighting configuration 330". For example, in one implementation, a rotating mechanism may be utilized for rotating the annular optical configuration 390 (e.g., or individual optical portions thereof) to be positioned in front of the annular lighting configuration 330" (e.g., wherein the annular optical configuration 390 and/or optical portions thereof may otherwise be off to a side or otherwise not in the path of the light from the annular lighting configuration 330" when not in use). In addition or alternatively, certain slots, clamps, holding mechanisms etc. may be utilized for holding/guiding the annular optical configuration 390 and/or optical portions thereof into place to be inserted in front of the annular lighting configuration 330".

As some specific numerical examples, in one implementation the first working distance WD1 may be in a range of approximately 30 mm-35 mm, while the second working distance WD2 may be within a range of approximately 50 mm-150 mm. As some further specific numerical examples, in one implementation, the first working distance WD1 may be approximately 34 mm, the second working distance WD2 may be approximately 61 mm, the first angle θ1 may be approximately 30.5° and the second angle θ2 may be approximately 18°. An annular optical configuration with certain optical portions (e.g., in the form of directional turning elements) that may be configured to operate according to such example values will be described in more detail below with respect to FIGS. 14 and 15.

FIGS. 11A and 11B are diagrams of an exemplary implementation of a portion of a metrology system (e.g., such as that of FIGS. 1-3), including a first objective lens 350-1 in FIG. 11A and a second objective lens 350-2 in FIG. 11B, and an annular lighting configuration 330" (e.g., such as that of FIGS. 6A and 6B). The annular lighting configuration 330" directs source light toward a first central volume CV1 which includes a first working distance focus position WDFP1 and a first focus range Refp1 that corresponds to the first objective lens 350-1, as illustrated in FIG. 11A, but does not include a second working distance focus position WDFP2 and second focus range Refp2 that corresponds to the second objective lens 350-2, as illustrated in FIG. 11B.

It is noted that FIG. 11B shows the focusing positions resulting from the operation of the VFL lens 370 (i.e., as noted above as shown in FIG. 3 but not shown in FIGS. 11A-11B) in combination with the second objective lens 350-2, with the resulting focus range Refp2 as indicated in FIG. 11B. As illustrated in FIG. 11B, the focus range Refp2, and the corresponding working distance WD2 and the working distance focus position WDFP2 (i.e., all as a result of using the second objective lens 350-2) are all different (e.g., further away from the objective lens configuration OLC) than the corresponding focus range Refp1, first working distance WD1, and first working distance focus position WDFP1 as illustrated in FIG. 11A (i.e., and as all corresponded to the utilization of the first objective lens 350-1). It is indicated that the focusing of the light by the annular lighting configuration 330" to the central volume CV1 which provided lighting at the appropriate location when operating with the first objective lens 350-1, is now not at an appropriate location when operating with the second objective lens 350-2 (i.e., which focuses at a different location).

In various implementations, the annular lighting configuration 330'" may be similar or identical to the annular lighting configuration 330' of FIGS. 6A and 6B, including lighting portions 330A-330H, which for simplicity only the lighting portions 330A and 330E (i.e., as corresponding to the cross-sectional view) are illustrated in FIGS. 11A and 11B. The optical axis OA is described with respect to FIG. 3, and in FIGS. 11A and 11B will be understood to correspond to the optical axis (e.g., corresponding to a central axis) of the annular lighting configuration 330", the objective lenses 350-1 and 350-2, as well as and the annular optical configuration 390 (e.g., as illustrated and described with respect to FIG. 12). An open central area OCA1 is illustrated within the annular lighting configuration 330", in which the objective lenses 350-1 and 350-2 may be at least partially positioned, and through which the optical path OPATH may pass (e.g., as described with respect to FIG. 3) and for which the annular lighting configuration 330' does not include any material in the open central area OCA1 (e.g., does not include any material that could alter the path or otherwise interfere with the image light 355 as described with respect to FIG. 3 as it travels along the optical path OPATH for accurately imaging the workpiece 320). The annular optical configuration 390 similarly has an open central area OCA2, as will be described in more detail below with respect to FIG. 12.

In the implementation of FIGS. 11A and 11B, eight lighting portions are utilized to provide light from eight discrete azimuthal directions (see lighting portions 330A to 330H of FIG. 6A). In FIGS. 11A and 11B, for simplicity of the illustration, only the light 332A1 and 332E1 from the lighting portions 330A and 330E are illustrated as directed in the directions DIR-A1 and DIR-E1, respectively.

As discussed above in the description of FIG. 3, through the operation of the VFL lens 370, the system focus position oscillates between a focus position EFP1 and a focus position EFP2, for which the distance between those focus positions is indicated as a focus range Refp. Correspondingly, in FIG. 11A, the focus range Refp1 is shown as corresponding to the difference between upper and lower focus positions, and is included within the first central volume CV1. In FIG. 11A, the first focus range Refp1 corresponds to the utilization of the VFL lens 370 in combination with the first objective lens 350-1, while in FIG. 11B, a second focus range Refp2 corresponds to the utilization of the VFL lens 370 in combination with the second objective lens 350-2.

Figure 12:
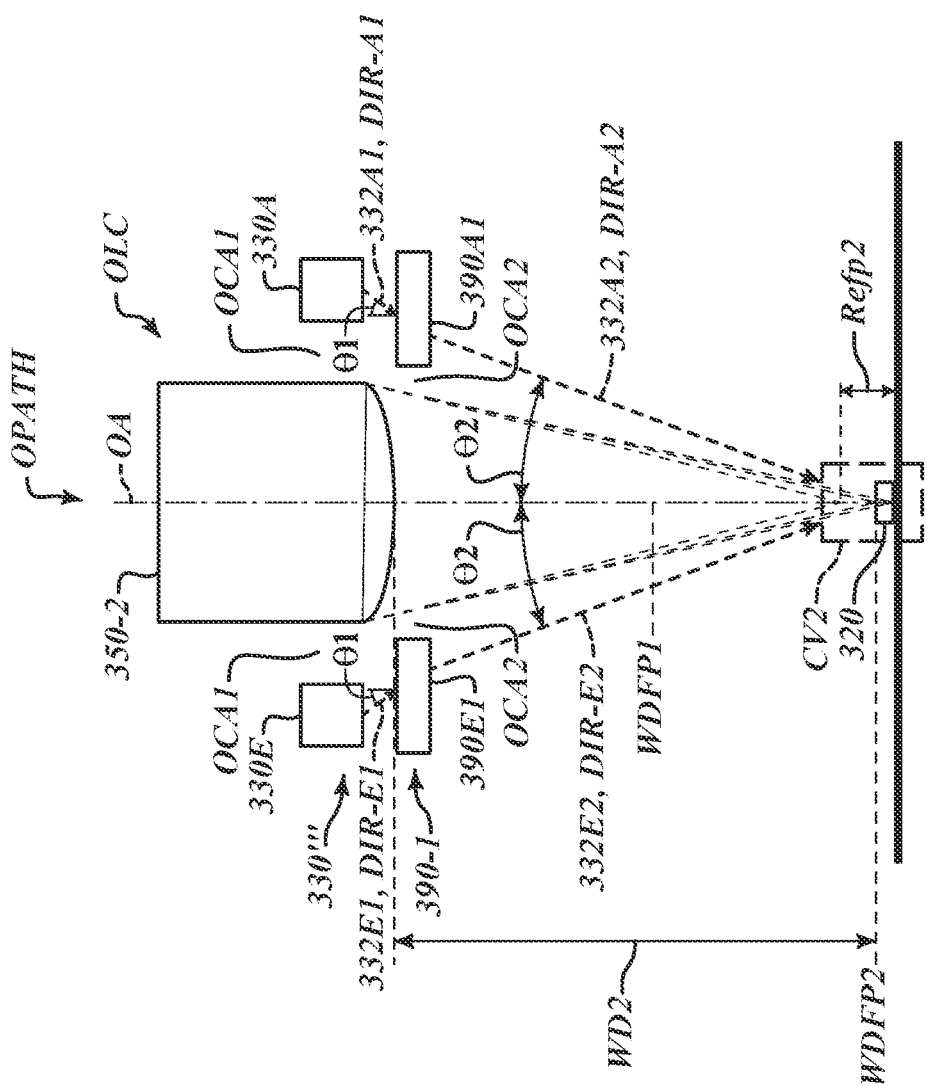
FIG. 12 is a diagram of the portion of the metrology system of FIG. 11B in which the second objective lens has been interchanged with/substituted for the first objective lens of FIG. 11A and including a first annular optical configuration that is positioned in front of the annular lighting configuration so as to redirect the source light toward a second central volume which includes the second working distance focus position and the second focus range that corresponds to the second objective lens.

FIG. 12 is a diagram of the portion of the metrology system of FIG. 11B in which the second objective lens 350-2 has been interchanged with/substituted for the first objective lens 350-1 of FIG. 11A and including a first annular optical configuration 390-1 that is positioned in front of the annular lighting configuration 330'" so as to redirect the source light toward a second central volume CV2 which includes the second working distance focus position WDFP2 and the second focus range Refp2 that corresponds to the second objective lens 350-2.

In certain implementations, the annular optical configuration 390-1 may include a similar number of optical portions (e.g., directional turning elements DTE as described below with respect to FIGS. 14 and 15, etc.) as there are lighting portions of the annular lighting configuration 330". For example, in relation to the annular lighting configuration 330'" with the lighting portions 330A-330H, the annular optical configuration 390-1 may include corresponding optical portions 390A1-390H1. As will be described in more detail below with respect to FIG. 13, a second annular optical configuration 390-2 may similarly include corresponding optical portions 390A2-390H2. When the annular optical configuration 390-1 is located in front of the annular lighting configuration 330' (i.e., in the path of the light), the respective optical portions may be located in front of their respective counterpart lighting portions (e.g., the optical portion 390A1 may be located in front of the corresponding lighting portion 330A, the optical portion 390B1 may be located in front of the corresponding lighting portion 330B, the optical portion 390E1 may be located in front of the corresponding lighting portion 330E, etc.).

Similar to the descriptions of FIGS. 11A and 11B, the lighting portion 330A directs the source light 332A1 in the direction DIR-A1, at an angle θ1. The optical portion 390A1 of the annular optical configuration 390-1 receives the source light 332A1 and redirects at least some of the source light 332A1 as source light 332A2 in the direction DIR-A2 at the angle θ2 toward the second central volume CV2. Similarly, the lighting portion 330E directs the source light 332E1 in the direction DIR-E1, at an angle θ1. The optical portion 390E1 of the annular optical configuration 390-1 receives the source light 332E1 and redirects at least some of the source light 332E1 as source light 332E2 in the direction DIR-E2 at the angle θ2 toward the second central volume CV2. The remaining optical portions of the annular optical configuration 390-1 will be understood to operate similarly, for receiving source light from the respective lighting portions and redirecting at least some of the source light in a corresponding direction DIR at the angle θ2 toward the second central volume CV2. The use of the annular optical configuration 390-1 in combination with the second objective lens 350-2 as positioned or inserted to be located in front of the annular lighting configuration 330' to redirect the source light 332 facilitates providing nominally uniform illumination in the X, Y and Z axis directions in at least a portion of the central volume CV2 at a plurality of focus positions, as well as for the system to be highly efficient when the second objective lens 350-2 is included in the objective lens configuration OLC.

With reference to FIGS. 2-5, 10 and 12, for example, the memory 140 may store program instructions that when executed by the one or more processors 125 cause the one or more processors 125 to control the annular lighting configuration 330", 330''' to direct light through the annular optical configuration 390 for illuminating the workpiece 320 while the second objective lens 350-2 is included in the objective lens configuration OLC. In some implementations, the program instructions stored in the memory 140 may further cause the one or more processors 125 to utilize the camera 360 to acquire a first image of the workpiece 320, wherein the first image corresponds to a first system focus position EFP along an optical axis OA of the objective lens configuration OLC. In some implementations, the program instructions stored in the memory 140 may further cause the one or more processors 125 to utilize the camera 360 to acquire an image stack comprising a plurality of images of the workpiece 320, wherein each image of the image stack corresponds to a different system focus position EFP along an optical axis OA of the objective lens configuration OLC for which the different system focus position EFPs result from the operation of the VFL lens 370 as controlled by the VFL lens controller 380.

Figure 13:
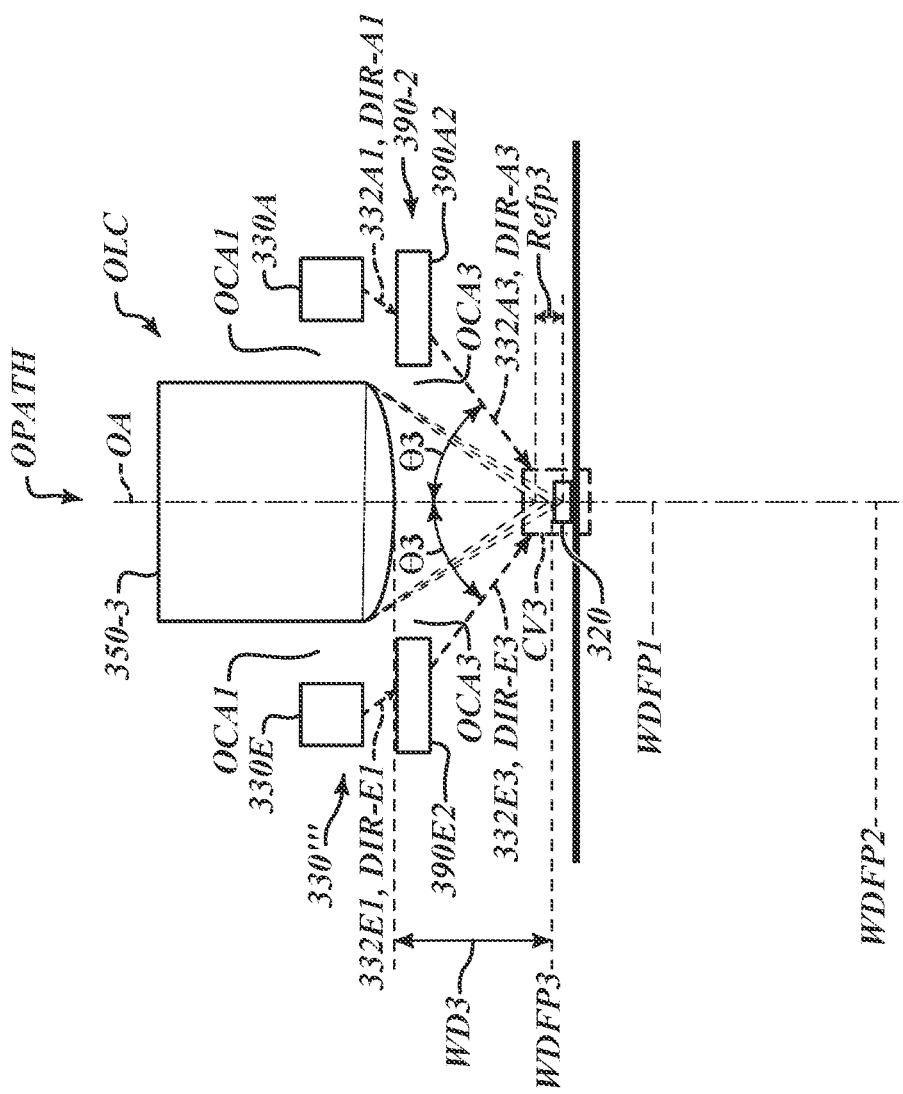
FIG. 13 is a diagram of the portion of the metrology system of FIG. 12 in which a third objective lens has been interchanged with/substituted for the second objective lens and including a second annular optical configuration that has been interchanged with/substituted for the first annular optical configuration so as to be positioned in front of the annular lighting configuration so as to redirect the source light toward a third central volume which includes a third working distance focus position and a third focus range as corresponding to the third objective lens.

FIG. 13 is a diagram of the portion of the metrology system of FIG. 12 in which a third objective lens 350-3 has been interchanged with/substituted for the second objective lens 350-2 and including a second annular optical configuration 390-2 that has been interchanged with/substituted for the first annular optical configuration 390-1 so as to be positioned in front of the annular lighting configuration 330" so as to redirect the source light toward a third central volume CV3 which includes a third working distance focus position WDFP3 and a third focus range Refp3 as corresponding to the third objective lens 350-3. The third central volume CV3 as illustrated does not include the first working distance focus position WDFP1 or the second working distance focus position WDFP2.

In certain implementations, the annular optical configuration 390-2 may include a similar number of optical portions (e.g., directional turning elements DTE as described below with respect to FIGS. 14 and 15, etc.) as there are lighting portions of the annular lighting configuration 330". For example, for the annular lighting configuration 330" with the lighting portions 330A-330H, the annular optical configuration 390-2 may include optical portions 390A2-390H2. When the annular optical configuration 390-2 is located in front of the annular lighting configuration 330" (i.e., in the path of the light), the respective optical portions may be located in front of their respective counterpart lighting portions (e.g., the optical portion 390A2 may be located in front of the corresponding lighting portion 330A, the optical portion 390B2 may be located in front of the corresponding lighting portion 330B, the optical portion 390E2 may be located in front of the corresponding lighting portion 330E, etc.).

Similar to the descriptions of FIGS. 11A, 11B, and 12, the lighting portion 330A directs the source light 332A1 in the direction DIR-A1, at an angle θ1. The optical portion 390A2 of the annular optical configuration 390-2 receives the source light 332A1 and redirects at least some of the source light 332A1 as source light 332A3 in the direction DIR-A3 at the angle θ3 toward the third central volume CV3. Similarly, the lighting portion 330E directs the source light 332E1 in the direction DIR-E1, at an angle θ1. The optical portion 390E2 of the annular optical configuration 390-2 receives the source light 332E1 and redirects at least some of the source light 332E1 as source light 332E3 in the direction DIR-E3 at the angle θ3 toward the third central volume CV3. The remaining optical portions of the annular optical configuration 390-2 will be understood to operate similarly, for receiving source light from the respective lighting portions and redirecting at least some of the source light in a corresponding direction DIR at the angle θ3 toward the third central volume CV3. The use of the annular optical configuration 390-2 in combination with the third objective lens 350-3 as positioned or inserted to be located in front of the annular lighting configuration 330''' to redirect the source light 332A facilitates providing nominally uniform illumination in the X, Y and Z axis directions in at least a portion of the third central volume CV3 at a plurality of focus positions, as well as for the system to be highly efficient when the third objective lens 350-3 is included in the objective lens configuration OLC.

It is noted that the working distance WD2 of FIG. 12 is longer than the working distance WD1 of FIGS. 11A and 11B, and thus provides an example of where an annular optical configuration 390 may be configured to redirect the source light to a central volume CV2 that is further from the objective lens configuration OLC (e.g., as compared to the central volume CV1 of the configuration of FIGS. 11A and 11B). In contrast, the working distance WD3 of FIG. 13 is shorter than the working distance WD1 of FIGS. 11A and 11B, and shorter than the working distance WD2 of FIG. 12, and thus provides an example of where an annular optical configuration 390 may be configured to redirect the source light to a central volume CV3 that is closer to the objective lens configuration OLC.

Figure 14:
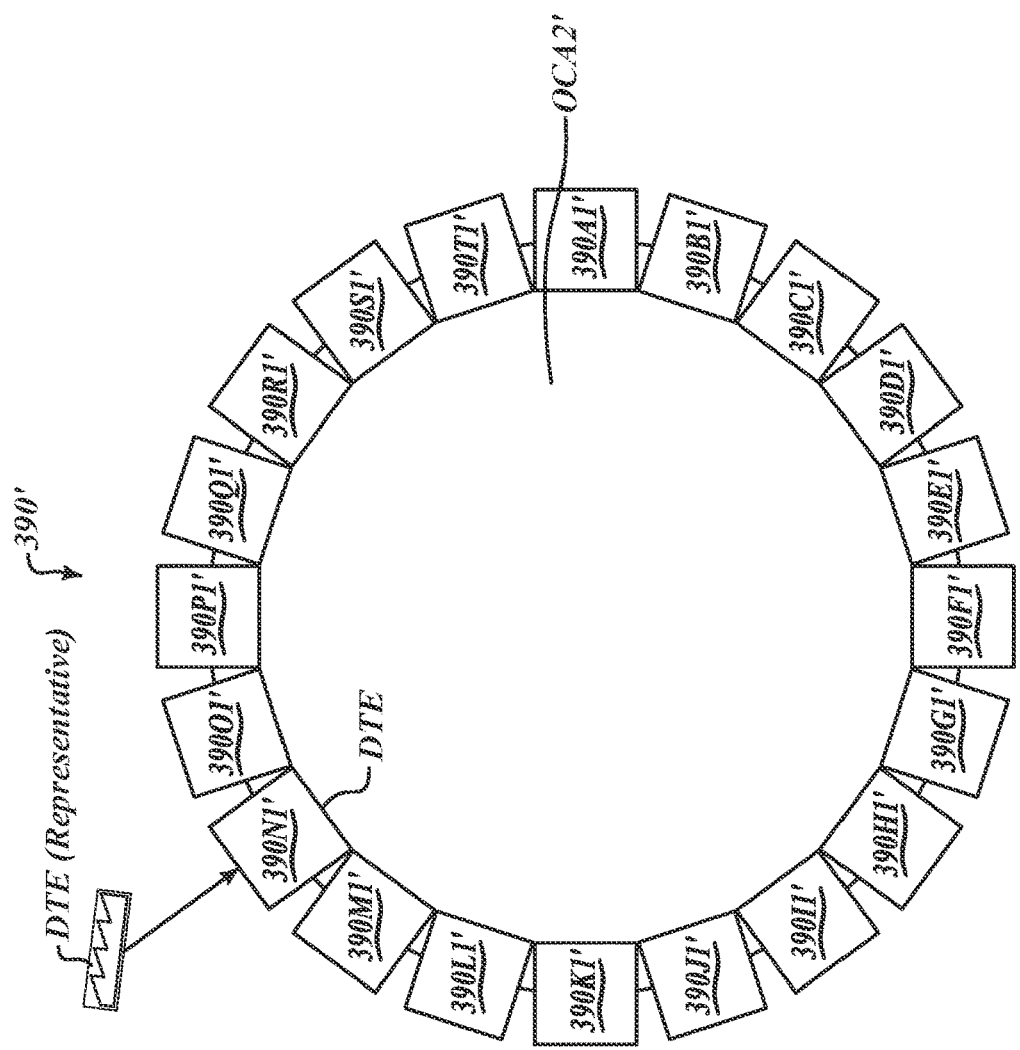
FIG. 14 is a diagram of an exemplary implementation of an annular optical configuration with twenty optical portions in the form of directional turning elements.

FIG. 14 is a diagram of an exemplary implementation of an annular optical configuration 390' with twenty optical portions 390A1'-390T1' in the form of directional turning elements DTE that are distributed in the annular optical configuration 390'. In various implementations, a number of optical portions (e.g., in the form of directional turning elements or other optical elements) may be equal to or less than a number of lighting portions of an annular lighting configuration. For example, in an implementation such as that of FIGS. 8-10 where the annular optical configuration 390' of FIG. 14 is utilized in combination with the annular lighting configuration 330", the number of lighting portions (e.g., more than 50 lighting portions) may be greater than the number of optical portions (e.g., the 20 optical portions 390A1'-390T1'). As another example, in the implementations of FIGS. 12 and 13, the number of lighting portions (e.g., the eight lighting portions 330A-330H) may be equal to the number of optical portions (e.g., optical portions 390A1-390H1 or 390A2-390H2). In another example, an annular optical configuration 390 may comprise at least four optical portions (e.g., comprising directional turning elements DTE) that are distributed in the annular optical arrangement, and an annular lighting configuration 330 may comprise at least four lighting portions that are distributed in an annular lighting arrangement, for which the number of lighting portions in the annular lighting configuration 330 may be equal to or greater than the number of optical portions in the annular optical configuration 390. The annular optical configuration 390 has an open central area OCA2, such as described in more detail above with respect to FIG. 12.

Figure 15:
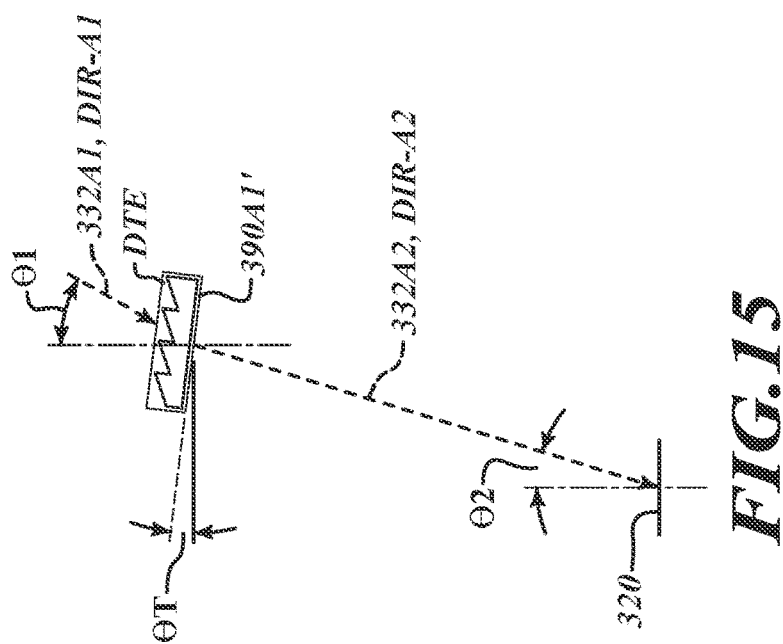
FIG. 15 is a diagram illustrating a configuration and operation of one of the optical portions of FIG. 14.

FIG. 15 is a diagram illustrating a configuration and operation of one of the optical portions 390A1' of FIG. 14. In the example of FIG. 15, the optical portion 390A1' comprises a directional turning element DTE (e.g., directional turning film) with a characteristic of 20°, which may be stated to be the degree of the directional turning element and indicates the amount that the corresponding source light is redirected by. The angle θT indicates the amount of tilt at which the directional turning element DTE is oriented. The angle θ1 indicates the angle of the incoming source light (e.g., from the annular lighting configuration) and the angle θ2 indicates the angle of the redirected source light (e.g., as redirected by the optical portion 390A1' of the annular optical configuration), such as described above in relation to the examples of FIGS. 10, 12 and 13. In one implementation, the angle θ2 may be related to the angles θ1, θT and the degree of the directional turning element, as indicated by the following equation:

$$\theta2=\theta1+\theta T-\text{(degree of directional turning element)} \quad \text{(Eq. 1)}$$

As some specific numerical examples, in one implementation, the angle θ1 may be approximately 30.5°, the angle θT may be approximately 7.5°, and the degree of the directional turning element may be approximately 20°. With such example values, the above equation indicates 18°=30.5°+7.5°−20°, for which the angle θ2 is thus approximately 18°.

As potential alternatives to the implementations of FIGS. 14 and 15, in other implementations, annular optical configurations may be formed as/include other optical elements which perform similar functions. For example, in various implementations, an annular optical configuration may be formed as/comprise an outer portion of a diverging lens, or an annular Fresnel lens element, each of which may have an open central area (e.g., similar to the open central areas OCA of FIGS. 12-14) for which central material (e.g., of the diverging lens or annular Fresnel lens element) has been removed or is otherwise not present and through which the imaging optical path OPATH is configured to pass. It will be appreciated that the corresponding sections of such an outer portion of a diverging lens or an annular Fresnel lens element may operate to redirect the source light 332 (e.g., similar to the functions/operations of the optical portions consisting of the directional turning elements DTE that are illustrated in FIGS. 14 and 15).

Figure 16:
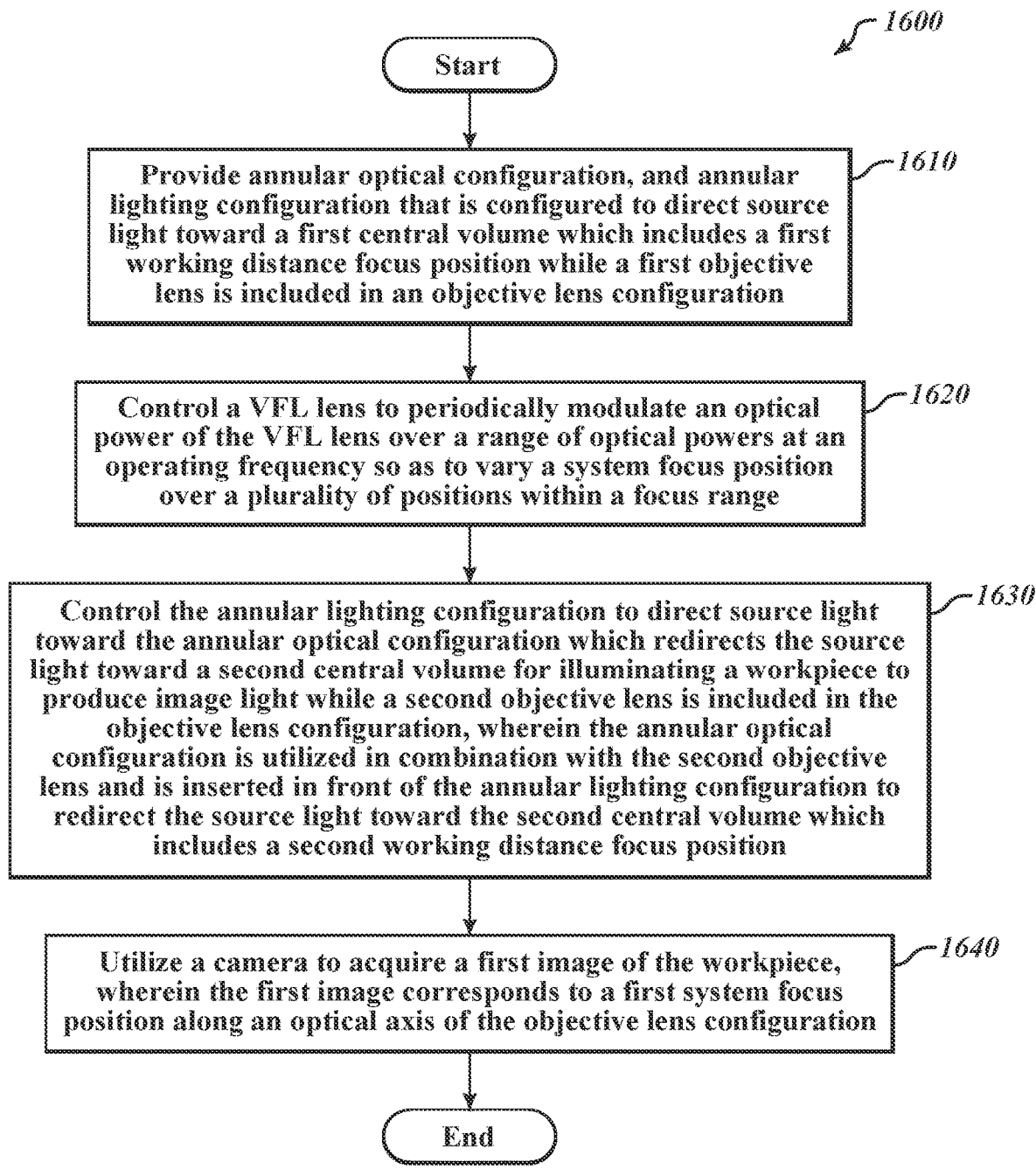
FIG. 16 is a flow diagram illustrating one exemplary implementation of a routine for operating a metrology system including certain features as disclosed herein.

FIG. 16 is a flow diagram illustrating one exemplary implementation of a routine 1600 for operating a metrology system, and will be described for convenience with reference to FIGS. 1-15. At a block 1610, an annular optical configuration 390 and an annular lighting configuration 330 are provided. The annular lighting configuration is configured to direct source light toward a first central volume CV1 which includes a first working distance focus position WDFP1 while a first objective lens 350-1 is included in an objective lens configuration OLC. In various implementations, the lighting configuration 330 comprises a plurality of lighting portions configured to illuminate a workpiece 320 for producing image light, wherein each lighting portion comprises an imaging lens portion and the lighting portions are distributed in an arrangement in which the imaging lens portion of each lighting portion is configured to direct light toward the first central volume CV1 (e.g., in which at least part of the resulting illumination within the first central volume CV1 is nominally uniform).

At a block 1620, a VFL lens 370 is controlled to periodically modulate an optical power of the VFL lens 370 over a range of optical powers at an operating frequency so as to vary a system focus position over a plurality of positions within a focus range EFP. At a block 1630, the annular lighting configuration 330 is controlled to direct source light toward the annular optical configuration 390 which redirects the source light toward a second central volume CV2 for illuminating a workpiece 320 to produce image light while a second objective lens 350-2 is included in the objective lens configuration OLC, wherein the annular optical configuration 390 is utilized in combination with the second objective lens 350-2 and is inserted in front of the annular lighting configuration 330 to redirect the source light toward the second central volume CV2 which includes a second working distance focus position WDFP2.

At a block 1640, a camera 360 is utilized to acquire a first image of the workpiece, wherein the first image corresponds to a first system focus position along an optical axis of the objective lens configuration. In various implementations, the camera 360 may be utilized to acquire an image stack comprising the first image and a plurality of additional images of the workpiece 320. Each image of the image stack corresponds to a different system focus position EFP along an optical axis OA of the objective lens configuration OLC for which the different system focus position EFPs result from the operation of the VFL lens 370 as controlled by the VFL lens controller 380. For each image of the image stack, the annular lighting configuration 330 is controlled to provide at least one instance of pulsed illumination timed to correspond with a respective phase timing of a periodically modulated system focus position EFP that corresponds to the respective system focus position EFP for that respective image of the image stack. In various implementations, focus curve data may be determined based at least in part on an analysis of the images of the image stack, wherein the focus curve data indicates 3 dimensional positions of a plurality of surface points on the workpiece 320 (e.g., see surface points P1, P2 and P3 in FIGS. 3 and 5).

The following describes various exemplary embodiments of the present disclosure with various features and elements annotated with reference numerals found in FIGS. 1-16. It should be understood that the reference numerals are added to indicate exemplary embodiments, and the features and elements are not limited to the particular embodiments illustrated in FIGS. 1-16.

As described herein, the VFL lens 370 may be a TAG lens which is a high-speed variable focal length lens (e.g., which operates based on an oscillating acoustic gradient in a fluid). The VFL lens 370 is used to capture single images at precise system focus positions/points of focus by operating the annular lighting configuration 330 as a pulsed light source with precise timing for illuminating the workpiece 320 (e.g., as described above with respect to FIGS. 4 and 5). The operation of the annular lighting configuration 330 as a pulsed light source delivers a pulse of light at a time precisely synchronized with the oscillatory voltage (e.g., as provided by the drive signal generator 381) as applied for the operation of the VFL lens 370. It has been determined that such fast and precisely timed pulses of light are desirable for good depth resolution in the imaging of the workpiece 320, and for which it has traditionally been difficult to provide enough light to the workpiece 320 to acquire images with sufficient contrast for certain applications (e.g., for points from focus type operations as described herein). In addition, providing sufficient illumination to the edges of the workpiece 320 has also been determined to be beneficial for the imaging. In order to achieve such desirable operating characteristics, the annular lighting configuration 330 includes lighting portions that are capable of providing the precisely timed and fast pulses of light, and which are distributed in an annular lighting arrangement, and which may be utilized in combination with the annular optical configuration 390 as described herein.

As illustrated and described with respect to FIG. 9, to illuminate the workpiece 320 as imaged by the first objective lens 350-1, the annular lighting configuration 330 is configured to direct the source light 332 towards a first central volume CV1 which includes the first working distance focus position WDFP1 while the first objective lens 350-1 is included in the objective lens configuration OLC. As indicated, the annular lighting configuration 330 may include a number of lighting portions (e.g., each of which may include a small LED, an optical fiber, and/or other light sources, as well as one or more lenses for directing the light toward the first central volume CV1). As described herein, at least a second objective lens 350-2 may also be utilized, and which may be substituted for the first objective lens 350-1 in the objective lens configuration OLC. The second objective lens 350-2 may have a different working distance WD2, as compared to the first working distance WD1 of the first objective lens 350-1 (e.g., and for which the different lenses may correspondingly have different focal points). As illustrated with respect to FIGS. 9 and 10, the directing of the source light 332 toward the first central volume CV1 will not provide the illumination at the needed distance for operating with the second objective lens 350-2, which has the second working distance WD2. As disclosed herein, in order to address this issue, the annular optical configuration 390 is provided and is located (e.g., positioned, inserted, etc.) in front of the annular lighting configuration 330" (i.e., in the path of the source light), to redirect the source light 332 toward the second central volume CV2 (i.e., which includes the second working distance focus position WDFP2 which corresponds to the second working distance WD2 of the second objective lens 350-2).

According to one aspect, a metrology system 100 includes a variable focal length (VFL) lens 370, a VFL lens controller 380, a camera 360, an objective lens configuration OLC, an annular lighting configuration 330, and an annular optical configuration 390. The VFL lens controller 380 is configured to control the VFL lens 370 to periodically modulate the optical power of the VFL lens 370 over a range of optical powers at an operating frequency, so as to vary a system focus position EFP of the system over a plurality of positions within a focus range Refp. The objective lens configuration OLC is configured to input image light 355 arising from a workpiece 320 and to transmit the image light 355 along an imaging optical path OPATH that passes through the VFL lens 370. The camera 360 is configured to receive image light 355 transmitted along the imaging optical path OPATH that passes through the VFL lens 370 and to provide images of the workpiece 320. The objective lens configuration OLC is configured to include one of a plurality of interchangeable objective lenses 350 at a time. The plurality of interchangeable objective lenses 350 includes at least a first objective lens 350-1 with a first working distance WD1 and a corresponding first working distance focus position WDFP1, and a second objective lens 350-2 with a second working distance WD2 and a corresponding second working distance focus position WDFP2. The annular lighting configuration 330 is configured to provide source light 332 for illuminating the workpiece for producing the image light 355. While the first objective lens 350-1 is included in the objective lens configuration 330, the annular lighting configuration 330 is configured to direct source light 332 toward a first central volume CV1 which includes the first working distance focus position WDFP1. The annular optical configuration 390 is configured to be utilized in combination with the second objective lens 350-2 while the second objective lens 350-2 is included in the objective lens configuration OLC and to be located in front of the annular lighting configuration 330 to redirect the source light 332 toward a second central volume CV2 which includes the second working distance focus position WDFP2.

In various implementations, the first central volume CV1 does not include the second working distance focus position WDFP2, and the second central volume CV2 does not include the first working distance focus position WDFP1. In various implementations, at least some of the source light 332 that is directed toward the first central volume CV1 by the annular lighting configuration 330 is directed at a first angular orientation θ1, and at least some of the source light 332 that is redirected toward the second central volume CV2 by the annular optical configuration 390 is redirected at a second angular orientation θ2 that is different than the first angular orientation ϕ1.

In various implementations, the system further comprises one or more processors 125 and a memory 140 coupled to the one or more processors 125 and storing program instructions that when executed by the one or more processors 125 cause the one or more processors 125 to at least control the annular lighting configuration 330 to direct light through the annular optical configuration 390 for illuminating the workpiece 320 while the second objective lens 350-2 is included in the objective lens configuration OLC. In various implementations, the program instructions when executed by the one or more processors 125 further cause the one or more processors 125 to utilize the camera 360 to acquire a first image of the workpiece 320, wherein the first image corresponds to a first system focus position EFP along an optical axis OA of the objective lens configuration OLC.

In various implementations, the program instructions when executed by the one or more processors 125 further cause the one or more processors 125 to utilize the camera 360 to acquire an image stack comprising a plurality of images of the workpiece 320, wherein each image of the image stack corresponds to a different system focus position EFP along an optical axis OA of the objective lens configuration OLC for which the different system focus positions EFPs result from the operation of the VFL lens 370 as controlled by the VFL lens controller 380. In various implementations, the program instructions when executed by the one or more processors 125 further cause the one or more processors 125 to determine focus curve data based at least in part on an analysis of the images of the image stack, wherein the focus curve data indicates 3 dimensional positions of a plurality of surface points on the workpiece 320 (e.g., see surface points P1, P2 and P3 in FIGS. 3 and 5). In various implementations, for each image of the image stack, the annular lighting configuration 330 is controlled to provide at least one instance of pulsed illumination timed to correspond with a respective phase timing of a periodically modulated system focus position EFP that corresponds to the respective system focus position EFP for that respective image of the image stack.

In various implementations, the annular optical configuration 390 is a first annular optical configuration 390-1, the plurality of interchangeable objective lenses 350 further comprises a third objective lens 350-3 with a third working distance WD3 and a corresponding third working distance focus position WDFP3, the system further comprises a second annular optical configuration 390-2 that is configured to be utilized in combination with the third objective lens 350-3 and to be interchangeable with the first annular optical configuration 390-1 in the system, and when the third objective lens 350-3 is interchanged with the second objective lens 350-2 to be included in the objective lens configuration OLC and the second annular optical configuration 390-2 is interchanged with the first annular optical configuration 390-1 to be located in front of the annular lighting configuration 330, the second annular optical configuration 390-2 redirects the source light 332 toward a third central volume CV3 which includes the third working distance focus position WDFP3 but does not include the first working distance focus position WDFP1 or the second working distance focus position WDFP2.

In various implementations, when the first objective lens 350-1 is included in the objective lens configuration OLC and the annular lighting configuration 330 directs source light 332 toward the first central volume CV1, the annular optical configuration 390 is not positioned in front the annular lighting configuration 330 to redirect the source light 332, and when the second objective lens 350-2 is interchanged with the first objective lens 350-1 to be included in the objective lens configuration OLC, the annular optical configuration 390 is at least one of positioned or inserted to be located in front of the annular lighting configuration 330 to redirect the source light 332 toward the second central volume CV2.

In various implementations, the annular lighting configuration 330 includes a plurality of lighting portions that are distributed in an annular lighting arrangement (e.g., see FIG. 6A which illustrates an implementation with eight lighting portions 330A-330H, and FIGS. 8-10 which illustrate an implementation with over fifty lighting portions). In various implementations, each lighting portion of the plurality of lighting portions comprises an optical fiber 335 that provides source light 332 and a lens that is configured to direct at least some of the source light 332 from the optical fiber 335 in a first angular orientation θ1 toward the first central volume CV1 when the annular optical configuration 390 is not positioned in front the annular lighting configuration 330 to redirect the source light 332. In various implementations, a first light source provides the source light 332 to all of the optical fibers 335 of the plurality of lighting portions (e.g., in various implementations the first light source may be part of light controller 333es of FIG. 3, or part of the lighting configuration 330, or as a separate component, such as may be controlled by the light controller 333es or otherwise).

In various implementations, the imaging optical path OPATH passes through an open central area OCA1 of the annular lighting configuration 330 and an open central area OCA2 of the annular optical configuration 390, which does not include any material in the imaging optical path OPATH. In various implementations, the annular optical configuration 390 comprises a plurality of directional turning elements DTE that are distributed in an annular optical arrangement. In various implementations, the plurality of directional turning elements DTE comprises at least four directional turning elements DTE that are distributed in the annular optical arrangement, and the annular lighting configuration 330 comprises at least four lighting portions that are distributed in an annular lighting arrangement, for which the number of lighting portions in the annular lighting configuration 330 may be equal to or greater than the number of directional turning elements in the annular optical configuration 390. In various implementations, the directional turning elements DTE comprise directional turning film.

In various implementations, the annular optical configuration 390 comprises an outer portion (e.g., of a diverging lens, or an annular Fresnel lens, etc.) with an open central area OCA2 for which central material has been removed or is otherwise not present and through which the imaging optical path OPATH is configured to pass (e.g., see FIG. 12 in regard to a potential implementation in which an outer portion of a diverging lens or annular Fresnel lens may be designated as having/being divided into portions 390A1-390H1, each of which may redirect respective source light 332, such as from a respective lighting portion, toward the second central volume CV2).

In accordance with another aspect, a method 1600 for operating the metrology system 100 is provided. The method 1600 includes controlling the VFL lens 370 to periodically modulate the optical power of the VFL lens 370 over a range of optical powers at an operating frequency so as to vary a system focus position EFP of the system over a plurality of positions within a focus range Refp, controlling the annular lighting configuration 330 to direct source light 332 toward the annular optical configuration 390 which redirects the source light 332 toward a second central volume CV2 for illuminating the workpiece 320 to produce image light 355 while the second objective lens 350-2 is included in the objective lens configuration OLC, and utilizing the camera 360 to acquire a first image of the workpiece 320. The first image corresponds to a first system focus position EFP along an optical axis OA of the objective lens configuration OLC. The annular optical configuration 390 is utilized in combination with the second objective lens 350-2 and is located in front of the annular lighting configuration 330 to redirect the source light 332 toward the second central volume CV2 which includes the second working distance focus position WDFP2.

In various implementations, the method 1600 further comprises utilizing the camera 360 to acquire an image stack comprising the first image and a plurality of additional images of the workpiece 320, wherein each image of the image stack corresponds to a different system focus position EFP along an optical axis OA of the objective lens configuration OLC for which the different system focus position EFPs result from the operation of the VFL lens 370 as controlled by the VFL lens controller 380, wherein for each image of the image stack, the annular lighting configuration 330 is controlled to provide at least one instance of pulsed illumination timed to correspond with a respective phase timing of a periodically modulated system focus position EFP that corresponds to the respective system focus position EFP for that respective image of the image stack, and determining focus curve data based at least in part on an analysis of the images of the image stack, wherein the focus curve data indicates 3 dimensional positions of a plurality of surface points on the workpiece 320.

In accordance with another aspect, an annular optical configuration 390 for utilization in the metrology system 100 is provided. The annular optical configuration 390 is configured to be utilized in combination with the second objective lens 350-2 while the second objective lens 350-2 is included in the objective lens configuration OLC and to be located in front of the annular lighting configuration 330 to redirect the source light 332 toward a second central volume CV2 which includes the second working distance focus position WDFP2. The annular lighting configuration 330 is configured to direct source light 332 toward the annular optical configuration 390 which redirects the source light 332 toward the second central volume CV2 for illuminating the workpiece 320 to produce the image light 355 while the second objective lens 350-2 is included in the objective lens configuration OLC. An open central area OCA2 of the annular optical configuration 390 does not include any material in the imaging optical path OPATH.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
   a variable focal length (VFL) lens;
   a VFL lens controller that is configured to control the VFL lens to periodically modulate the optical power of the VFL lens over a range of optical powers at an operating frequency so as to vary a system focus position of the system over a plurality of positions within a focus range;
   a camera configured to receive image light transmitted along an imaging optical path that passes through the VFL lens and to provide images of a workpiece;
   an objective lens configuration that is configured to input image light arising from the workpiece and to transmit the image light along the imaging optical path that passes through the VFL lens, wherein the objective lens configuration is configured to include one of a plurality of interchangeable objective lenses at a time, the plurality of interchangeable objective lenses comprising at least a first objective lens with a first working distance and a corresponding first working distance focus position, and a second objective lens with a second working distance and a corresponding second working distance focus position;
   an annular lighting configuration that is configured to provide source light for illuminating the workpiece for producing the image light; and
   an annular optical configuration;
   wherein:
      the annular lighting configuration is configured to direct source light toward a first central volume which includes the first working distance focus position while the first objective lens is included in the objective lens configuration; and
      the annular optical configuration is configured to be utilized in combination with the second objective lens while the second objective lens is included in the objective lens configuration and to be located in front of the annular lighting configuration to redirect the source light toward a second central volume which includes the second working distance focus position.

2. The system of claim 1, wherein the first central volume does not include the second working distance focus position and the second central volume does not include the first working distance focus position.

3. The system of claim 1, wherein:
   at least some of the source light that is directed toward the first central volume by the annular lighting configuration is directed at a first angular orientation; and
   at least some of the source light that is redirected toward the second central volume by the annular optical configuration is redirected at a second angular orientation that is different than the first angular orientation.

4. The system of claim 1, further comprising:
   one or more processors; and
   a memory coupled to the one or more processors and storing program instructions that when executed by the one or more processors cause the one or more processors to at least:
      control the annular lighting configuration to direct light through the annular optical configuration for illuminating the workpiece while the second objective lens is included in the objective lens configuration.

5. The system of claim 4, wherein the program instructions when executed by the one or more processors further cause the one or more processors to utilize the camera to acquire a first image of the workpiece, wherein the first image corresponds to a first system focus position along an optical axis of the objective lens configuration.

6. The system of claim 4, wherein the program instructions when executed by the one or more processors further cause the one or more processors to utilize the camera to acquire an image stack comprising a plurality of images of the workpiece, wherein each image of the image stack corresponds to a different system focus position along an optical axis of the objective lens configuration for which the different system focus positions result from the operation of the VFL lens as controlled by the VFL lens controller.

7. The system of claim 6, wherein the program instructions when executed by the one or more processors further cause the one or more processors to determine focus curve data based at least in part on an analysis of the images of the image stack, wherein the focus curve data indicates 3 dimensional positions of a plurality of surface points on the workpiece.

8. The system of claim 6, wherein for each image of the image stack, the annular lighting configuration is controlled to provide at least one instance of pulsed illumination timed to correspond with a respective phase timing of a periodically modulated system focus position that corresponds to the respective system focus position for that respective image of the image stack.

9. The system of claim 1, wherein:
the annular optical configuration is a first annular optical configuration;
the plurality of interchangeable objective lenses further comprises a third objective lens with a third working distance and a corresponding third working distance focus position;
the system further comprises a second annular optical configuration that is configured to be utilized in combination with the third objective lens and to be interchangeable with the first annular optical configuration in the system; and
when the third objective lens is interchanged with the second objective lens to be included in the objective lens configuration and the second annular optical configuration is interchanged with the first annular optical configuration to be located in front of the annular lighting configuration, the second annular optical configuration redirects the source light toward a third central volume which includes the third working distance focus position but does not include the first working distance focus position or the second working distance focus position.

10. The system of claim 1, wherein:
when the first objective lens is included in the objective lens configuration and the annular lighting configuration directs source light toward the first central volume, the annular optical configuration is not positioned in front the annular lighting configuration to redirect the source light; and
when the second objective lens is interchanged with the first objective lens to be included in the objective lens configuration, the annular optical configuration is at least one of positioned or inserted to be located in front of the annular lighting configuration to redirect the source light toward the second central volume.

11. The system of claim 1, wherein the VFL lens is a tunable acoustic gradient (TAG) lens.

12. The system of claim 1, wherein annular lighting configuration comprises a plurality of lighting portions that are distributed in an annular lighting arrangement.

13. The system of claim 12, wherein each lighting portion of the plurality of lighting portions comprises an optical fiber that provides source light and a lens that is configured to direct at least some of the source light from the optical fiber in a first angular orientation toward the first central volume when the annular optical configuration is not positioned in front the annular lighting configuration to redirect the source light.

14. The system of claim 13, wherein a first light source provides the source light to all of the optical fibers of the plurality of lighting portions.

15. The system of claim 1, wherein the imaging optical path passes through an open central area of the annular lighting configuration and an open central area of the annular optical configuration which does not include any material in the imaging optical path.

16. The system of claim 1, wherein the annular optical configuration comprises a plurality of directional turning elements that are distributed in an annular optical arrangement.

17. The system of claim 16, wherein:
the plurality of directional turning elements comprises at least four directional turning elements that are distributed in the annular optical arrangement; and
the annular lighting configuration comprises at least four lighting portions that are distributed in an annular lighting arrangement, for which the number of lighting portions in the annular lighting configuration is equal to or greater than the number of directional turning elements in the annular optical configuration.

18. The system of claim 16, wherein the directional turning elements comprise directional turning film.

19. The system of claim 1, wherein the annular optical configuration comprises an outer portion of a diverging lens with an open central area for which central material has been removed or is otherwise not present and through which the imaging optical path is configured to pass.

20. The system of claim 1, wherein the annular optical configuration comprises an annular Fresnel lens element with an open central area for which central material has been removed or is otherwise not present and through which the imaging optical path is configured to pass.

21. A method for operating a metrology system,
the metrology system comprising:
a variable focal length (VFL) lens;
a camera configured to receive image light transmitted along an imaging optical path that passes through the VFL lens and to provide images of a workpiece;
an objective lens configuration that is configured to input image light arising from the workpiece and to transmit the image light along the imaging optical path that passes through the VFL lens, wherein the objective lens configuration is configured to include one of a plurality of interchangeable objective lenses at a time, the plurality of interchangeable objective lenses comprising at least a first objective lens with a first working distance and a corresponding first working distance focus position, and a second objective lens with a second working distance and a corresponding second working distance focus position;
an annular lighting configuration that is configured to provide source light and to direct source light toward a first central volume which includes the first working distance focus position while the first objective lens is included in the objective lens configuration; and
an annular optical configuration;
the method comprising:
controlling the VFL lens to periodically modulate the optical power of the VFL lens over a range of optical powers at an operating frequency so as to vary a system focus position of the system over a plurality of positions within a focus range;

controlling the annular lighting configuration to direct source light toward the annular optical configuration which redirects the source light toward a second central volume for illuminating the workpiece to produce image light while the second objective lens is included in the objective lens configuration, wherein the annular optical configuration is utilized in combination with the second objective lens and is located in front of the annular lighting configuration to redirect the source light toward the second central volume which includes the second working distance focus position; and utilizing the camera to acquire a first image of the workpiece, wherein the first image corresponds to a first system focus position along an optical axis of the objective lens configuration.

22. The method of claim 21, further comprising:

utilizing the camera to acquire an image stack comprising the first image and a plurality of additional images of the workpiece, wherein each image of the image stack corresponds to a different system focus position along an optical axis of the objective lens configuration for which the different system focus positions result from the operation of the VFL lens as controlled to periodically modulate the optical power of the VFL lens, wherein for each image of the image stack, the annular lighting configuration is controlled to provide at least one instance of pulsed illumination timed to correspond with a respective phase timing of a periodically modulated system focus position that corresponds to the respective system focus position for that respective image of the image stack; and determining focus curve data based at least in part on an analysis of the images of the image stack, wherein the focus curve data indicates 3 dimensional positions of a plurality of surface points on the workpiece.

23. The method of claim 21, wherein:

the annular optical configuration is a first annular optical configuration;

the plurality of interchangeable objective lenses further comprises a third objective lens with a third working distance and a corresponding third working distance focus position;

the system further comprises a second annular optical configuration that is configured to be utilized in combination with the third objective lens and to be interchangeable with the first annular optical configuration in the system; and when the third objective lens is interchanged with the second objective lens to be included in the objective lens configuration and the second annular optical configuration is interchanged with the first annular optical configuration to be located in front of the annular lighting configuration, the second annular optical configuration redirects the source light toward a third central volume which includes the third working distance focus position but does not include the first working distance focus position or the second working distance focus position.

24. The method of claim 21, wherein:

when the first objective lens is included in the objective lens configuration and the annular lighting configuration directs source light toward the first central volume, the annular optical configuration is not positioned in front the annular lighting configuration to redirect the source light; and when the second objective lens is interchanged with the first objective lens to be included in the objective lens configuration, the annular optical configuration is at least one of positioned or inserted to be located in front of the annular lighting configuration to redirect the source light toward the second central volume.

25. An annular optical configuration for utilization in a metrology system, the metrology system comprising:

a variable focal length (VFL) lens;

VFL lens controller that is configured to control the VFL lens to periodically modulate the optical power of the VFL lens over a range of optical powers at an operating frequency so as to vary a system focus position of the system over a plurality of positions within a focus range;

a camera configured to receive image light transmitted along an imaging optical path that passes through the VFL lens and to provide images of a workpiece;

an objective lens configuration that is configured to input image light arising from the workpiece and to transmit the image light along the imaging optical path that passes through the VFL lens, wherein the objective lens configuration is configured to include one of a plurality of interchangeable objective lenses at a time, the plurality of interchangeable objective lenses comprising at least a first objective lens with a first working distance and a corresponding first working distance focus position, and a second objective lens with a second working distance and a corresponding second working distance focus position;

an annular lighting configuration that is configured to direct source light toward a first central volume which includes the first working distance focus position while the first objective lens is included in the objective lens configuration;

wherein:

the annular optical configuration is configured to be utilized in combination with the second objective lens while the second objective lens is included in the objective lens configuration and to be located in front of the annular lighting configuration to redirect the source light toward a second central volume which includes the second working distance focus position;

the annular lighting configuration is configured to direct source light toward the annular optical configuration which redirects the source light toward the second central volume for illuminating the workpiece to produce the image light; and an open central area of the annular optical configuration does not include any material in the imaging optical path.

* * * * *